United States Patent
Meki

(10) Patent No.: US 9,001,646 B2
(45) Date of Patent: Apr. 7, 2015

(54) INFORMATION TRANSMISSION DEVICE, INFORMATION TRANSMISSION SYSTEM AND INFORMATION TRANSMISSION METHOD

(71) Applicant: Fujitsu Limited, Kawasaki-shi, Kanagawa (JP)

(72) Inventor: Seiji Meki, Nonoichi (JP)

(73) Assignee: Fujitsu Limited, Kawasaki (JP)

( * ) Notice: Subject to any disclaimer, the term of this patent is extended or adjusted under 35 U.S.C. 154(b) by 87 days.

(21) Appl. No.: 13/754,383

(22) Filed: Jan. 30, 2013

(65) Prior Publication Data

US 2013/0242722 A1 Sep. 19, 2013

(30) Foreign Application Priority Data

Mar. 19, 2012 (JP) ................................. 2012-062774

(51) Int. Cl.
| | |
|---|---|
| *H04L 1/00* | (2006.01) |
| *H04L 12/26* | (2006.01) |
| *H04L 12/24* | (2006.01) |
| *H04L 12/40* | (2006.01) |
| *H04L 12/437* | (2006.01) |
| *H04L 12/46* | (2006.01) |

(52) U.S. Cl.
CPC ............ *H04L 41/0659* (2013.01); *H04L 12/40* (2013.01); *H04L 12/437* (2013.01); *H04L 12/4641* (2013.01)

(58) Field of Classification Search
None
See application file for complete search history.

(56) References Cited

U.S. PATENT DOCUMENTS

| | | | |
|---|---|---|---|
| 2006/0209895 A1 | 9/2006 | Hirota | |
| 2009/0219808 A1* | 9/2009 | Ogura | 370/223 |
| 2010/0074102 A1 | 3/2010 | Mutoh et al. | |
| 2010/0158025 A1* | 6/2010 | Meki | 370/401 |
| 2011/0063971 A1* | 3/2011 | Tochio | 370/224 |

FOREIGN PATENT DOCUMENTS

| | | |
|---|---|---|
| JP | 2006-261806 | 9/2006 |
| JP | 2010-74674 | 4/2010 |
| JP | 2011-228911 | 11/2011 |

* cited by examiner

*Primary Examiner* — Chirag Shah
*Assistant Examiner* — Srinivasa Reddivalam
(74) *Attorney, Agent, or Firm* — Staas & Halsey LLP

(57) ABSTRACT

An information transmission device includes: ring-ports; an access-port; a communication-path-setting unit to facilitate or cut off communication of the ring-ports or the access-port, based on a communication setting determined such that communication paths having priority levels and assigned with same identifiers have different sections; a control-signal-transmission unit, when a communication failure occurs between one ring-port and another information transmission device, to transmit, from another ring-port, a first control signal for instructing a cutoff of communication of the access-port in the communication path having a low priority level, and transmit a second control signal for instructing a facilitation of communication of the ring-ports; an access-port-control unit, upon receiving the first control signal, to cut off the communication of the access-port in the communication path having the low priority level; and a ring-port-control unit, upon receiving the second control signal, to facilitate communication of the ring-port having non-communication failure.

9 Claims, 25 Drawing Sheets

FIG. 4

| FIELD | LENGTH (BYTES) | CONTENTS |
|---|---|---|
| DA | 6 | DESTINATION ADDRESS |
| SA | 6 | TRANSMISSION SOURCE ADDRESS |
| VLAN TAG | 4 | TYPE VALUE (2 BYTES) AND TAG CONTROL INFORMATION (2 BYTES) TAG CONTROL INFORMATION INCLUDED IN VLAN ID (10 BITS). TYPE VALUE: 0xfff0 |
| TYPE | 2 | TYPE VALUE |
| DATA | 42 TO 1500 | FREE |
| FCS | 4 | FRAME ERROR DETECTION |

| VLAN | Port | TRANSMISSION/RECEPTION SETTING | CHANGE |
|---|---|---|---|
| 0 | 1 | OFF | NO |
| | 2 | OFF | NO |
| 1 | 1 | OFF | NO |
| | 2 | OFF | NO |
| ... | ... | ... | ... |
| 4095 | 1 | OFF | NO |
| | 2 | OFF | NO |

202

| VLAN | Port | TRANSMISSION/RECEPTION SETTING | CHANGE |
|---|---|---|---|
| 0 | 1 | OFF | NO |
| | 2 | OFF | NO |
| 1 | 1 | OFF | NO |
| | 2 | OFF | NO |
| ... | ... | ... | ... |
| 4095 | 1 | OFF | NO |
| | 2 | OFF | NO |

203

| VLAN | Port | TRANSMISSION/RECEPTION SETTING | CHANGE |
|---|---|---|---|
| 0 | 1 | OFF | NO |
| | 2 | OFF | NO |
| 1 | 1 | OFF | NO |
| | 2 | OFF | NO |
| ... | ... | ... | ... |
| 4095 | 1 | OFF | NO |
| | 2 | OFF | NO |

204

| VLAN | Port | TRANSMISSION/RECEPTION SETTING | CHANGE |
|---|---|---|---|
| 0 | 1 | OFF | NO |
| | 2 | OFF | NO |
| 1 | 1 | OFF | NO |
| | 2 | OFF | NO |
| ... | ... | ... | ... |
| 4095 | 1 | OFF | NO |
| | 2 | OFF | NO |

205

| VLAN | Port | TRANSMISSION/RECEPTION SETTING | CHANGE |
|---|---|---|---|
| 0 | 1 | OFF | NO |
| | 2 | OFF | NO |
| 1 | 1 | OFF | NO |
| | 2 | OFF | NO |
| ... | ... | ... | ... |
| 4095 | 1 | OFF | NO |
| | 2 | OFF | NO |

206

| VLAN | Port | TRANSMISSION/RECEPTION SETTING | CHANGE |
|---|---|---|---|
| 0 | 1 | OFF | NO |
| | 2 | OFF | NO |
| 1 | 1 | OFF | NO |
| | 2 | OFF | NO |
| ... | ... | ... | ... |
| 4095 | 1 | OFF | NO |
| | 2 | OFF | NO |

207

| VLAN | Port | TRANSMISSION/RECEPTION SETTING | CHANGE |
|---|---|---|---|
| 0 | 1 | OFF | NO |
| | 2 | OFF | NO |
| 1 | 1 | OFF | NO |
| | 2 | OFF | NO |
| ... | ... | ... | ... |
| 4095 | 1 | OFF | NO |
| | 2 | OFF | NO |

208

| VLAN | Port | TRANSMISSION/RECEPTION SETTING | CHANGE |
|---|---|---|---|
| 0 | 1 | OFF | NO |
| | 2 | OFF | NO |
| 1 | 1 | OFF | NO |
| | 2 | OFF | NO |
| ... | ... | ... | ... |
| 4095 | 1 | OFF | NO |
| | 2 | OFF | NO |

| VLAN | Port | TRANSMISSION/RECEPTION SETTING | CHANGE |
|---|---|---|---|
| 0 | 3 | OFF | NO |
|  | 4 | OFF | NO |
|  | 5 | OFF | NO |
| 1 | 3 | OFF | NO |
|  | 4 | OFF | NO |
|  | 5 | OFF | NO |
| ... | ... | ... | ... |
| 4095 | 3 | OFF | NO |
|  | 4 | OFF | NO |
|  | 5 | OFF | NO |

212

| VLAN | Port | TRANSMISSION/RECEPTION SETTING | CHANGE |
|---|---|---|---|
| 0 | 3 | OFF | NO |
|  | 4 | OFF | NO |
|  | 5 | OFF | NO |
| 1 | 3 | OFF | NO |
|  | 4 | OFF | NO |
|  | 5 | OFF | NO |
| ... | ... | ... | ... |
| 4095 | 3 | OFF | NO |
|  | 4 | OFF | NO |
|  | 5 | OFF | NO |

213

| VLAN | Port | TRANSMISSION/RECEPTION SETTING | CHANGE |
|---|---|---|---|
| 0 | 3 | OFF | NO |
|  | 4 | OFF | NO |
|  | 5 | OFF | NO |
| 1 | 3 | OFF | NO |
|  | 4 | OFF | NO |
|  | 5 | OFF | NO |
| ... | ... | ... | ... |
| 4095 | 3 | OFF | NO |
|  | 4 | OFF | NO |
|  | 5 | OFF | NO |

214

| VLAN | Port | TRANSMISSION/RECEPTION SETTING | CHANGE |
|---|---|---|---|
| 0 | 3 | OFF | NO |
|  | 4 | OFF | NO |
|  | 5 | OFF | NO |
| 1 | 3 | OFF | NO |
|  | 4 | OFF | NO |
|  | 5 | OFF | NO |
| ... | ... | ... | ... |
| 4095 | 3 | OFF | NO |
|  | 4 | OFF | NO |
|  | 5 | OFF | NO |

218

| VLAN | Port | TRANSMISSION/RECEPTION SETTING | PRIORITY LEVEL |
|---|---|---|---|
| 0 | 3 | OFF | - |
|  | 4 | OFF | - |
|  | 5 | OFF | - |
| 1 | 3 | OFF | - |
|  | 4 | OFF | - |
|  | 5 | OFF | - |
| ... | ... | ... | ... |
| 4095 | 3 | OFF | - |
|  | 4 | OFF | - |
|  | 5 | OFF | - |

217

| VLAN | Port | TRANSMISSION/RECEPTION SETTING | PRIORITY LEVEL |
|---|---|---|---|
| 0 | 3 | OFF | - |
|  | 4 | OFF | - |
|  | 5 | OFF | - |
| 1 | 3 | OFF | - |
|  | 4 | OFF | - |
|  | 5 | OFF | - |
| ... | ... | ... | ... |
| 4095 | 3 | OFF | - |
|  | 4 | OFF | - |
|  | 5 | OFF | - |

216

| VLAN | Port | TRANSMISSION/RECEPTION SETTING | PRIORITY LEVEL |
|---|---|---|---|
| 0 | 3 | OFF | - |
|  | 4 | OFF | - |
|  | 5 | OFF | - |
| 1 | 3 | OFF | - |
|  | 4 | OFF | - |
|  | 5 | OFF | - |
| ... | ... | ... | ... |
| 4095 | 3 | OFF | - |
|  | 4 | OFF | - |
|  | 5 | OFF | - |

215

| VLAN | Port | TRANSMISSION/RECEPTION SETTING | PRIORITY LEVEL |
|---|---|---|---|
| 0 | 3 | OFF | - |
|  | 4 | OFF | - |
|  | 5 | OFF | - |
| 1 | 3 | OFF | - |
|  | 4 | OFF | - |
|  | 5 | OFF | - |
| ... | ... | ... | ... |
| 4095 | 3 | OFF | - |
|  | 4 | OFF | - |
|  | 5 | OFF | - |

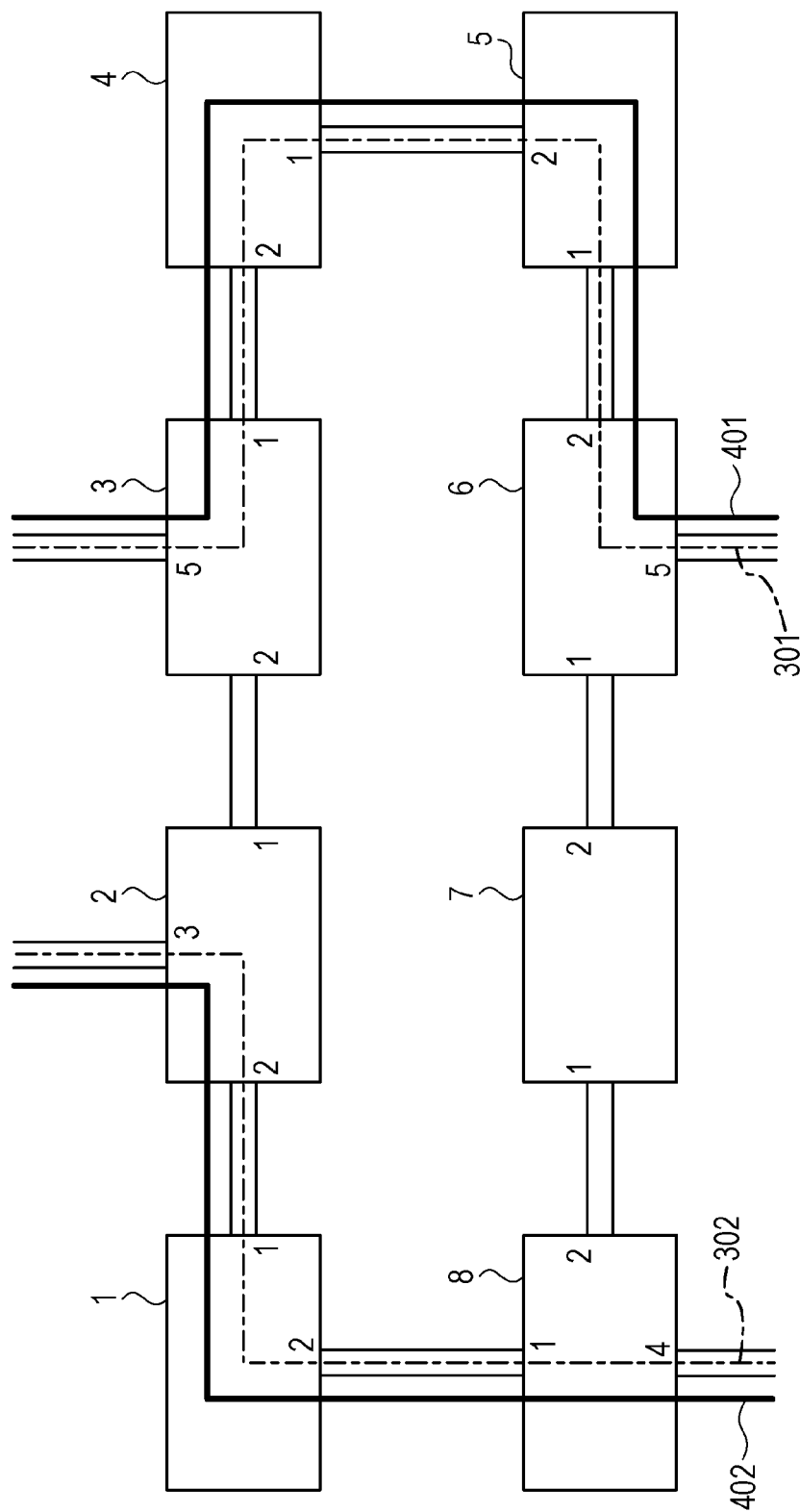

| VLAN | Port | TRANSMISSION/RECEPTION SETTING | CHANGE |
|---|---|---|---|
| 100 | 1 | ON | NO |
|  | 2 | ON | NO |

202

| VLAN | Port | TRANSMISSION/RECEPTION SETTING | CHANGE |
|---|---|---|---|
| 100 | 1 | OFF | NO |
|  | 2 | ON | NO |

203

| VLAN | Port | TRANSMISSION/RECEPTION SETTING | CHANGE |
|---|---|---|---|
| 100 | 1 | ON | NO |
|  | 2 | OFF | NO |

204

| VLAN | Port | TRANSMISSION/RECEPTION SETTING | CHANGE |
|---|---|---|---|
| 100 | 1 | ON | NO |
|  | 2 | ON | NO |

208

| VLAN | Port | TRANSMISSION/RECEPTION SETTING | CHANGE |
|---|---|---|---|
| 100 | 1 | ON | NO |
|  | 2 | OFF | NO |

207

| VLAN | Port | TRANSMISSION/RECEPTION SETTING | CHANGE |
|---|---|---|---|
| 100 | 1 | OFF | NO |
|  | 2 | OFF | NO |

206

| VLAN | Port | TRANSMISSION/RECEPTION SETTING | CHANGE |
|---|---|---|---|
| 100 | 1 | OFF | NO |
|  | 2 | ON | NO |

205

| VLAN | Port | TRANSMISSION/RECEPTION SETTING | CHANGE |
|---|---|---|---|
| 100 | 1 | ON | NO |
|  | 2 | ON | NO |

211

| VLAN | Port | TRANSMISSION/RECEPTION SETTING | PRIORITY LEVEL |
|---|---|---|---|
| 100 | 3 | OFF | – |
|  | 4 | OFF | – |
|  | 5 | OFF | – |

212

| VLAN | Port | TRANSMISSION/RECEPTION SETTING | PRIORITY LEVEL |
|---|---|---|---|
| 100 | 3 | ON | Low |
|  | 4 | OFF | – |
|  | 5 | OFF | – |

213

| VLAN | Port | TRANSMISSION/RECEPTION SETTING | PRIORITY LEVEL |
|---|---|---|---|
| 100 | 3 | OFF | – |
|  | 4 | OFF | – |
|  | 5 | ON | High |

214

| VLAN | Port | TRANSMISSION/RECEPTION SETTING | PRIORITY LEVEL |
|---|---|---|---|
| 100 | 3 | OFF | – |
|  | 4 | OFF | – |
|  | 5 | OFF | – |

218

| VLAN | Port | TRANSMISSION/RECEPTION SETTING | PRIORITY LEVEL |
|---|---|---|---|
| 100 | 3 | OFF | – |
|  | 4 | ON | Low |
|  | 5 | OFF | – |

217

| VLAN | Port | TRANSMISSION/RECEPTION SETTING | PRIORITY LEVEL |
|---|---|---|---|
| 100 | 3 | OFF | – |
|  | 4 | OFF | – |
|  | 5 | OFF | – |

216

| VLAN | Port | TRANSMISSION/RECEPTION SETTING | PRIORITY LEVEL |
|---|---|---|---|
| 100 | 3 | OFF | – |
|  | 4 | OFF | – |
|  | 5 | ON | High |

215

| VLAN | Port | TRANSMISSION/RECEPTION SETTING | PRIORITY LEVEL |
|---|---|---|---|
| 100 | 3 | OFF | – |
|  | 4 | OFF | – |
|  | 5 | OFF | – |

| VLAN | Port | TRANSMISSION/RECEPTION SETTING | CHANGE |
|---|---|---|---|
| 100 | 1 | ON | NO |
| 100 | 2 | ON | NO |

202

| VLAN | Port | TRANSMISSION/RECEPTION SETTING | CHANGE |
|---|---|---|---|
| 100 | 1 | OFF | NO |
| 100 | 2 | ON | NO |

203

| VLAN | Port | TRANSMISSION/RECEPTION SETTING | CHANGE |
|---|---|---|---|
| 100 | 1 | ON | NO |
| 100 | 2 | OFF | NO |

204

| VLAN | Port | TRANSMISSION/RECEPTION SETTING | CHANGE |
|---|---|---|---|
| 100 | 1 | ON | NO |
| 100 | 2 | ON | NO |

208

| VLAN | Port | TRANSMISSION/RECEPTION SETTING | CHANGE |
|---|---|---|---|
| 100 | 1 | ON | NO |
| 100 | 2 | OFF | NO |

207

| VLAN | Port | TRANSMISSION/RECEPTION SETTING | CHANGE |
|---|---|---|---|
| 100 | 1 | OFF | NO |
| 100 | 2 | ON | NO |

206

| VLAN | Port | TRANSMISSION/RECEPTION SETTING | CHANGE |
|---|---|---|---|
| 100 | 1 | OFF | NO |
| 100 | 2 | ON | NO |

205

| VLAN | Port | TRANSMISSION/RECEPTION SETTING | CHANGE |
|---|---|---|---|
| 100 | 1 | ON | NO |
| 100 | 2 | ON | NO |

211

| VLAN | Port | TRANSMISSION/RECEPTION SETTING | PRIORITY LEVEL |
|---|---|---|---|
| 100 | 3 | OFF | - |
| 100 | 4 | OFF | Low |
| 100 | 5 | OFF | - |

(221)

212

| VLAN | Port | TRANSMISSION/RECEPTION SETTING | PRIORITY LEVEL |
|---|---|---|---|
| 100 | 3 | OFF | Low |
| 100 | 4 | OFF | - |
| 100 | 5 | OFF | - |

(220)

213

| VLAN | Port | TRANSMISSION/RECEPTION SETTING | PRIORITY LEVEL |
|---|---|---|---|
| 100 | 3 | OFF | - |
| 100 | 4 | OFF | - |
| 100 | 5 | ON | High |

(222)

214

| VLAN | Port | TRANSMISSION/RECEPTION SETTING | PRIORITY LEVEL |
|---|---|---|---|
| 100 | 3 | OFF | - |
| 100 | 4 | OFF | - |
| 100 | 5 | OFF | - |

218

| VLAN | Port | TRANSMISSION/RECEPTION SETTING | PRIORITY LEVEL |
|---|---|---|---|
| 100 | 3 | OFF | - |
| 100 | 4 | OFF | - |
| 100 | 5 | OFF | - |

217

| VLAN | Port | TRANSMISSION/RECEPTION SETTING | PRIORITY LEVEL |
|---|---|---|---|
| 100 | 3 | OFF | - |
| 100 | 4 | OFF | - |
| 100 | 5 | OFF | - |

216

| VLAN | Port | TRANSMISSION/RECEPTION SETTING | PRIORITY LEVEL |
|---|---|---|---|
| 100 | 3 | OFF | - |
| 100 | 4 | OFF | - |
| 100 | 5 | ON | High |

(223)

215

| VLAN | Port | TRANSMISSION/RECEPTION SETTING | PRIORITY LEVEL |
|---|---|---|---|
| 100 | 3 | OFF | - |
| 100 | 4 | OFF | - |
| 100 | 5 | OFF | - |

FIG. 12

201:
| VLAN | Port | TRANSMISSION/RECEPTION SETTING | CHANGE |
|---|---|---|---|
| 100 | 1 | ON | NO |
|  | 2 | ON | NO |

202:
| VLAN | Port | TRANSMISSION/RECEPTION SETTING | CHANGE |
|---|---|---|---|
| 100 | 1 | ON | NO |
|  | 2 | ON | YES |

203:
| VLAN | Port | TRANSMISSION/RECEPTION SETTING | CHANGE |
|---|---|---|---|
| 100 | 1 | ON | NO |
|  | 2 | ON | YES |

204:
| VLAN | Port | TRANSMISSION/RECEPTION SETTING | CHANGE |
|---|---|---|---|
| 100 | 1 | OFF | YES |
|  | 2 | ON | NO |

205:
| VLAN | Port | TRANSMISSION/RECEPTION SETTING | CHANGE |
|---|---|---|---|
| 100 | 1 | ON | NO |
|  | 2 | OFF | YES |

206:
| VLAN | Port | TRANSMISSION/RECEPTION SETTING | CHANGE |
|---|---|---|---|
| 100 | 1 | ON | YES |
|  | 2 | ON | NO |

207:
| VLAN | Port | TRANSMISSION/RECEPTION SETTING | CHANGE |
|---|---|---|---|
| 100 | 1 | ON | YES |
|  | 2 | ON | YES |

208:
| VLAN | Port | TRANSMISSION/RECEPTION SETTING | CHANGE |
|---|---|---|---|
| 100 | 1 | ON | NO |
|  | 2 | ON | YES |

211:
| VLAN | Port | TRANSMISSION/RECEPTION SETTING | PRIORITY LEVEL |
|---|---|---|---|
| 100 | 3 | OFF | – |
|  | 4 | OFF | Low |
|  | 5 | OFF | – |

212:
| VLAN | Port | TRANSMISSION/RECEPTION SETTING | PRIORITY LEVEL |
|---|---|---|---|
| 100 | 3 | OFF | – |
|  | 4 | OFF | – |
|  | 5 | OFF | – |

213:
| VLAN | Port | TRANSMISSION/RECEPTION SETTING | PRIORITY LEVEL |
|---|---|---|---|
| 100 | 3 | OFF | Low |
|  | 4 | OFF | – |
|  | 5 | OFF | – |

214:
| VLAN | Port | TRANSMISSION/RECEPTION SETTING | PRIORITY LEVEL |
|---|---|---|---|
| 100 | 3 | OFF | – |
|  | 4 | OFF | – |
|  | 5 | OFF | – |

215:
| VLAN | Port | TRANSMISSION/RECEPTION SETTING | PRIORITY LEVEL |
|---|---|---|---|
| 100 | 3 | OFF | – |
|  | 4 | OFF | – |
|  | 5 | OFF | – |

216:
| VLAN | Port | TRANSMISSION/RECEPTION SETTING | PRIORITY LEVEL |
|---|---|---|---|
| 100 | 3 | OFF | – |
|  | 4 | OFF | – |
|  | 5 | ON | High |

217:
| VLAN | Port | TRANSMISSION/RECEPTION SETTING | PRIORITY LEVEL |
|---|---|---|---|
| 100 | 3 | OFF | – |
|  | 4 | OFF | – |
|  | 5 | OFF | – |

218:
| VLAN | Port | TRANSMISSION/RECEPTION SETTING | PRIORITY LEVEL |
|---|---|---|---|
| 100 | 3 | OFF | – |
|  | 4 | OFF | – |
|  | 5 | ON | High |

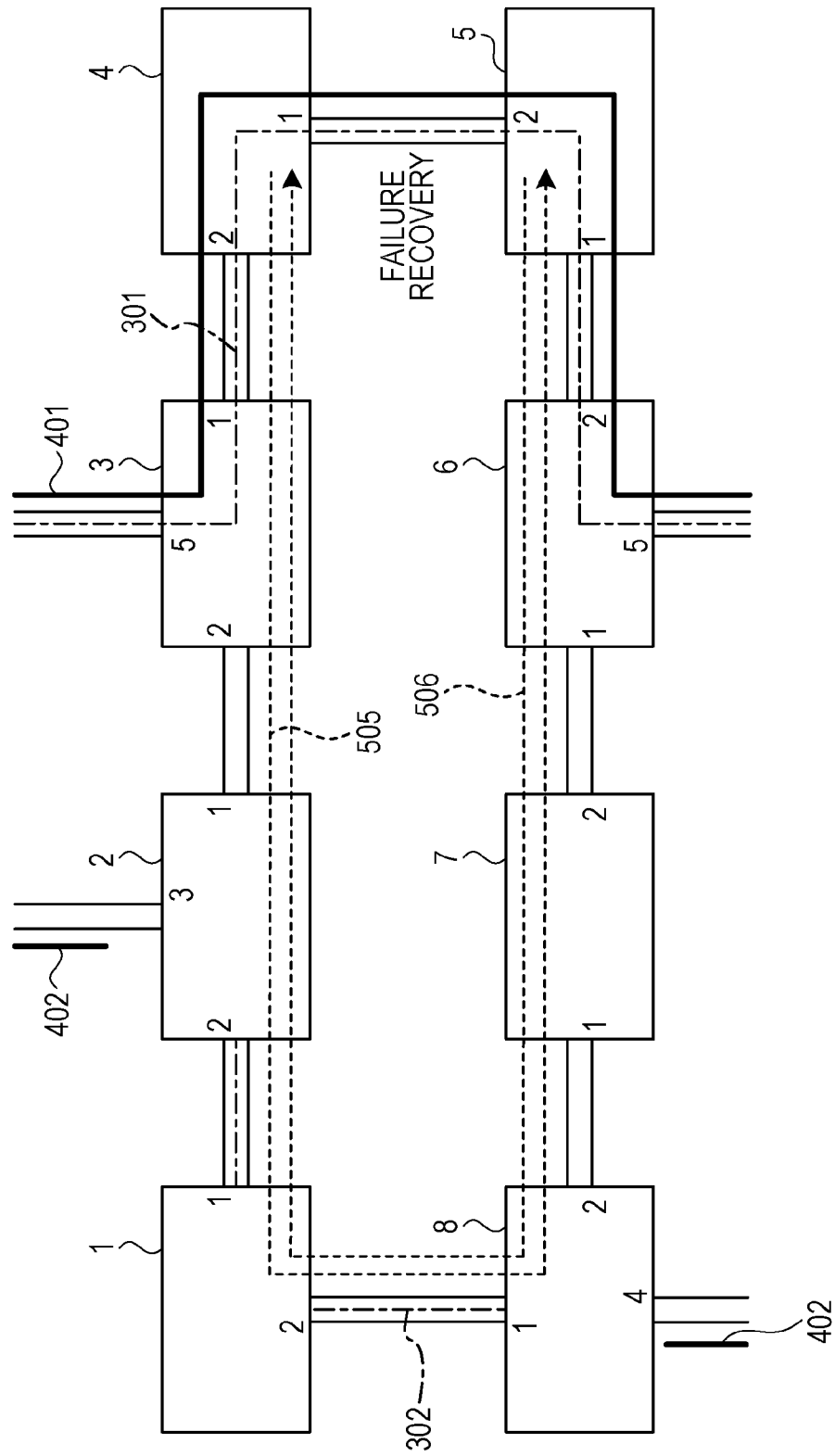

FIG. 14

201
| VLAN | Port | TRANSMISSION/ RECEPTION SETTING | CHANGE |
|---|---|---|---|
| 100 | 1 | ON | NO |
| | 2 | ON | NO |

202
| VLAN | Port | TRANSMISSION/ RECEPTION SETTING | CHANGE |
|---|---|---|---|
| 100 | 1 | ON | NO |
| | 2 | ON | YES |

203
| VLAN | Port | TRANSMISSION/ RECEPTION SETTING | CHANGE |
|---|---|---|---|
| 100 | 1 | ON | NO |
| | 2 | OFF | NO |

204
| VLAN | Port | TRANSMISSION/ RECEPTION SETTING | CHANGE |
|---|---|---|---|
| 100 | 1 | ON | NO |
| | 2 | ON | NO |

208
| VLAN | Port | TRANSMISSION/ RECEPTION SETTING | CHANGE |
|---|---|---|---|
| 100 | 1 | ON | NO |
| | 2 | OFF | NO |

207
| VLAN | Port | TRANSMISSION/ RECEPTION SETTING | CHANGE |
|---|---|---|---|
| 100 | 1 | OFF | NO |
| | 2 | OFF | NO |

206
| VLAN | Port | TRANSMISSION/ RECEPTION SETTING | CHANGE |
|---|---|---|---|
| 100 | 1 | OFF | NO |
| | 2 | ON | NO |

205
| VLAN | Port | TRANSMISSION/ RECEPTION SETTING | CHANGE |
|---|---|---|---|
| 100 | 1 | ON | NO |
| | 2 | ON | NO |

211
| VLAN | Port | TRANSMISSION/ RECEPTION SETTING | PRIORITY LEVEL |
|---|---|---|---|
| 100 | 3 | OFF | - |
| | 4 | OFF | - |
| | 5 | OFF | - |

212
| VLAN | Port | TRANSMISSION/ RECEPTION SETTING | PRIORITY LEVEL |
|---|---|---|---|
| 100 | 3 | OFF | - |
| | 4 | OFF | Low |
| | 5 | OFF | - |

213
| VLAN | Port | TRANSMISSION/ RECEPTION SETTING | PRIORITY LEVEL |
|---|---|---|---|
| 100 | 3 | OFF | - |
| | 4 | OFF | - |
| | 5 | ON | High |

214
| VLAN | Port | TRANSMISSION/ RECEPTION SETTING | PRIORITY LEVEL |
|---|---|---|---|
| 100 | 3 | OFF | - |
| | 4 | OFF | - |
| | 5 | OFF | - |

218
| VLAN | Port | TRANSMISSION/ RECEPTION SETTING | PRIORITY LEVEL |
|---|---|---|---|
| 100 | 3 | OFF | - |
| | 4 | OFF | - |
| | 5 | OFF | - |

217
| VLAN | Port | TRANSMISSION/ RECEPTION SETTING | PRIORITY LEVEL |
|---|---|---|---|
| 100 | 3 | OFF | - |
| | 4 | OFF | Low |
| | 5 | OFF | - |

216
| VLAN | Port | TRANSMISSION/ RECEPTION SETTING | PRIORITY LEVEL |
|---|---|---|---|
| 100 | 3 | OFF | - |
| | 4 | OFF | - |
| | 5 | ON | High |

215
| VLAN | Port | TRANSMISSION/ RECEPTION SETTING | PRIORITY LEVEL |
|---|---|---|---|
| 100 | 3 | OFF | - |
| | 4 | OFF | - |
| | 5 | OFF | - |

FIG. 16

201:
| VLAN | Port | TRANSMISSION/ RECEPTION SETTING | CHANGE |
|---|---|---|---|
| 100 | 1 | ON | NO |
|  | 2 | ON | NO |

202:
| VLAN | Port | TRANSMISSION/ RECEPTION SETTING | CHANGE |
|---|---|---|---|
| 100 | 1 | OFF | NO |
|  | 2 | ON | NO |

203:
| VLAN | Port | TRANSMISSION/ RECEPTION SETTING | CHANGE |
|---|---|---|---|
| 100 | 1 | ON | NO |
|  | 2 | OFF | NO |

204:
| VLAN | Port | TRANSMISSION/ RECEPTION SETTING | CHANGE |
|---|---|---|---|
| 100 | 1 | ON | NO |
|  | 2 | ON | NO |

208:
| VLAN | Port | TRANSMISSION/ RECEPTION SETTING | CHANGE |
|---|---|---|---|
| 100 | 1 | ON | NO |
|  | 2 | OFF | NO |

207:
| VLAN | Port | TRANSMISSION/ RECEPTION SETTING | CHANGE |
|---|---|---|---|
| 100 | 1 | OFF | NO |
|  | 2 | OFF | NO |

206:
| VLAN | Port | TRANSMISSION/ RECEPTION SETTING | CHANGE |
|---|---|---|---|
| 100 | 1 | ON | NO |
|  | 2 | OFF | NO |

205:
| VLAN | Port | TRANSMISSION/ RECEPTION SETTING | CHANGE |
|---|---|---|---|
| 100 | 1 | ON | NO |
|  | 2 | ON | NO |

211:
| VLAN | Port | TRANSMISSION/ RECEPTION SETTING | PRIORITY LEVEL |
|---|---|---|---|
| 100 | 3 | OFF | – |
|  | 4 | OFF | – |
|  | 5 | OFF | – |

212:
| VLAN | Port | TRANSMISSION/ RECEPTION SETTING | PRIORITY LEVEL |
|---|---|---|---|
| 100 | 3 | ON | Low |
|  | 4 | OFF | – |
|  | 5 | OFF | – |

213:
| VLAN | Port | TRANSMISSION/ RECEPTION SETTING | PRIORITY LEVEL |
|---|---|---|---|
| 100 | 3 | OFF | – |
|  | 4 | OFF | – |
|  | 5 | ON | High |

214:
| VLAN | Port | TRANSMISSION/ RECEPTION SETTING | PRIORITY LEVEL |
|---|---|---|---|
| 100 | 3 | OFF | – |
|  | 4 | OFF | – |
|  | 5 | OFF | – |

218:
| VLAN | Port | TRANSMISSION/ RECEPTION SETTING | PRIORITY LEVEL |
|---|---|---|---|
| 100 | 3 | OFF | – |
|  | 4 | ON | Low |
|  | 5 | OFF | – |

217:
| VLAN | Port | TRANSMISSION/ RECEPTION SETTING | PRIORITY LEVEL |
|---|---|---|---|
| 100 | 3 | OFF | – |
|  | 4 | OFF | – |
|  | 5 | OFF | – |

216:
| VLAN | Port | TRANSMISSION/ RECEPTION SETTING | PRIORITY LEVEL |
|---|---|---|---|
| 100 | 3 | OFF | – |
|  | 4 | OFF | – |
|  | 5 | ON | High |

215:
| VLAN | Port | TRANSMISSION/ RECEPTION SETTING | PRIORITY LEVEL |
|---|---|---|---|
| 100 | 3 | OFF | – |
|  | 4 | OFF | – |
|  | 5 | OFF | – |

252, 253 (brace labels)

INFORMATION TRANSMISSION DEVICE, INFORMATION TRANSMISSION SYSTEM AND INFORMATION TRANSMISSION METHOD

CROSS-REFERENCE TO RELATED APPLICATION

This application is based upon and claims the benefit of priority of the prior Japanese Patent Application No. 2012-062774, filed on Mar. 19, 2012, the entire contents of which are incorporated herein by reference.

FIELD

The embodiment discussed herein relates to an information transmission device, an information transmission system, and an information transmission method.

BACKGROUND

Networks are expected to have high reliability when communication is conducted over multiple networks. To improve network reliability, networks preferably have a physical redundant route between various information transmission devices based on bridges that represent one type of device for relaying data in networks. A ring topology is one type of network configuration having redundancy.

A network having a ring topology connects nodes on the network in a ring shape. Herein-below, a network with a ring topology is simply referred to as a "ring." It is conceivable that frames with unknown addresses may loop in the ring making normal communication difficult. Accordingly, relaying of a frame from a specific port is interrupted using a protocol for ring control and a frame relay path between any of the network devices is uniquely decided. The point where this interruption occurs may be called a "block point" and a technique for interrupting the network and resolving the looping is called "blocking." When a failure occurs in a network, a ring that uses this type of blocking is able to restart communication in a path in which the failure did not occur by changing the block point.

Recently, communication using virtual local area networks (VLANs) has increased in order to more effectively use network resources. A VLAN is a virtual network using a VLAN identification (VLAN ID) as an identifier. A VLAN ID is defined in the Institute of Electrical and Electronics Engineers, Inc. (IEEE) 802.1Q, and is an ID for using one physical network as a plurality of virtual networks. A VLAN ID is stored in a VLAN tag field inside a frame and one VLAN ID corresponds to one network. VLAN setting is generally conducted for conducting communication in a network using a ring topology.

Japanese Patent Laid-open No. 2006-261806 discusses a technique, which is known as a conventional technique in a network having a ring topology, for setting a block point in each VLAN and selecting a VLAN having the path with the fewest number of hops as the optimal path.

SUMMARY

According to an aspect of the invention, an information transmission device includes: a pair of ring ports of a first ring port and a second ring port, each configured to communicate with an adjacent another information transmission device to form a ring network therewith; an access port configured to communicate with a network outside of the ring network; a communication path setting unit configured to facilitate or cut off communication of the ring ports or the access port, based on a communication setting determined such that a plurality of communication paths having priority levels and assigned with same identifiers have different sections in the ring network; a control signal transmission unit, when a communication failure occurs between the first ring port and another information transmission device, configured to transmit, from the second ring port, a first control signal for instructing a cutoff of communication of the access port in the communication path having a low priority level, and transmit a second control signal for instructing a facilitation of communication of the ring ports; an access port control unit, upon receiving the first control signal, configured to cut off the communication of the access port in the communication path having the low priority level; and a ring port control unit, upon receiving the second control signal, configured to facilitate communication of the ring port having non-communication failure.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 describes a control frame format;

FIG. 5 illustrates ring port VLAN connection setting tables for bridges in which VLAN setting has not been conducted;

FIG. 6 illustrates access port VLAN connection setting tables for bridges in which VLAN setting has not been conducted;

FIG. 7 illustrates an initial communication setting facilitation state;

FIG. 8 illustrates tables in bridges under an initial communication setting state;

FIG. 10 illustrates tables in bridges that have received a first control frame;

FIG. 12 illustrates tables in bridges that have received a second control frame;

FIG. 13 illustrates a facilitation state changed by a third control frame;

FIG. 14 illustrates tables in bridges that have received a third control frame;

FIG. 16 illustrates tables in bridges that have received a fourth control frame;

DESCRIPTION OF EMBODIMENTS

When using blocking in a VLAN having a ring topology, a node that frames do not reach may exist if VLAN facilitation at each ring port in all the nodes in the ring is not made possible. As a result, a VLAN having the same VLAN ID is limited to one VLAN inside one ring network, and establishing a plurality of VLANs is difficult. Then, one user is able to use one path. Accordingly, the number of users that can be accommodated in one ring network is limited to the maximum number of identifiers that may be assigned to the VLAN which is 4095 users.

Moreover, when a block point is set in VLAN units, the number of VLANs having the same identifiers that are able to use to the ring network at the same time is one, and thus the number of users that are able to use one ring network at the same time is limited in the same way. Accordingly, it is difficult to use one ring network with a number of users that exceeds the maximum number of VLANs.

An information transmission device, an information transmission system, and an information transmission method that use a ring network with the number of users exceeding the VLAN maximum number will be described.

Hereinafter, an information transmission device, an information transmission system, and an information transmission method will be described with reference to the drawings. The transmitting device and information acquisition control method disclosed below are not limited to the following embodiments.

Figure 1:
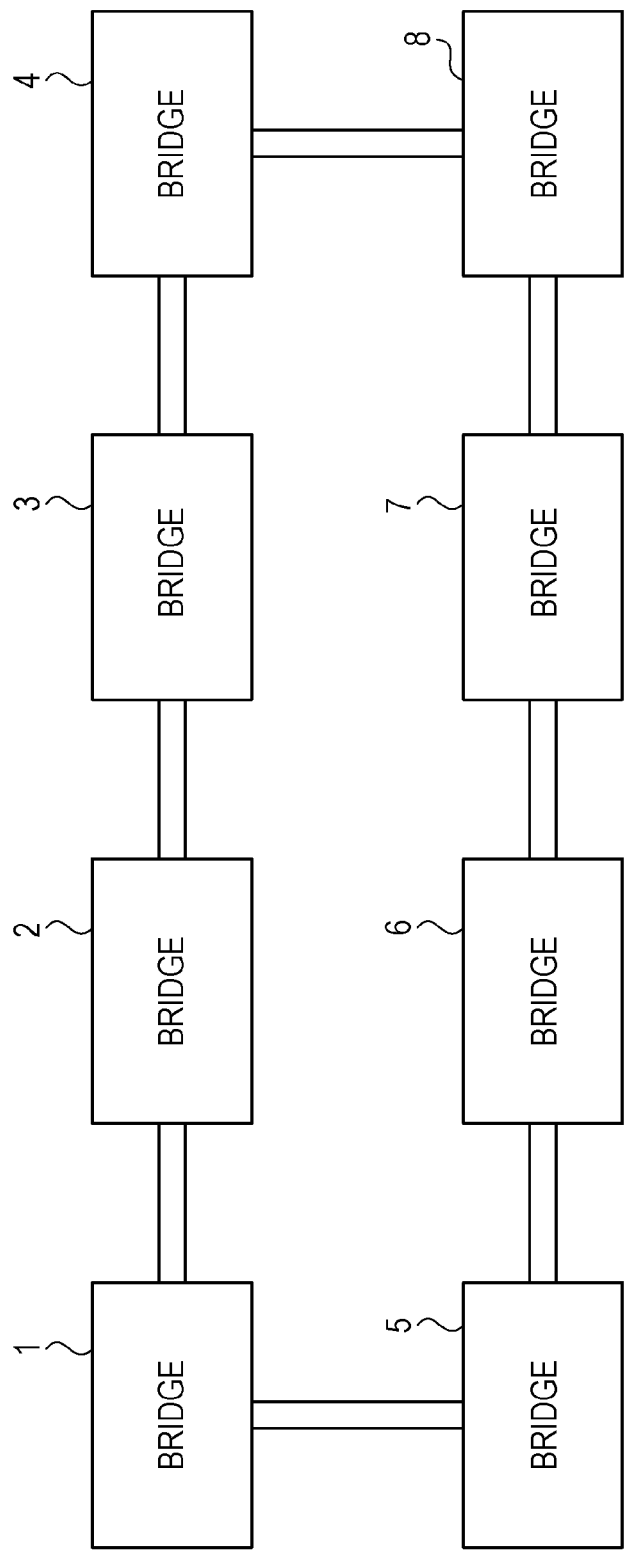
FIG. 1 illustrates a configuration of an information transmission system according to an embodiment.

FIG. 1 illustrates a configuration of an information transmission system according to an embodiment. An information transmission system according to the present embodiment has bridges 1 to 8 connected in a ring as illustrated in FIG. 1. Although eight bridges are arranged as an information transmission device in the present embodiment, the number of information transmission devices is not limited in particular so long as the devices are connected in a ring shape. Moreover, the information transmission device may be, for example, a layer 2 (L2) switch in addition to an L2 transmission device.

Further, the bridges 1 to 8 are connected with clockwise optical fiber and anti-clockwise optical fiber. The two lines connecting the bridges in FIG. 1 represent the optical fiber.

Figure 2:
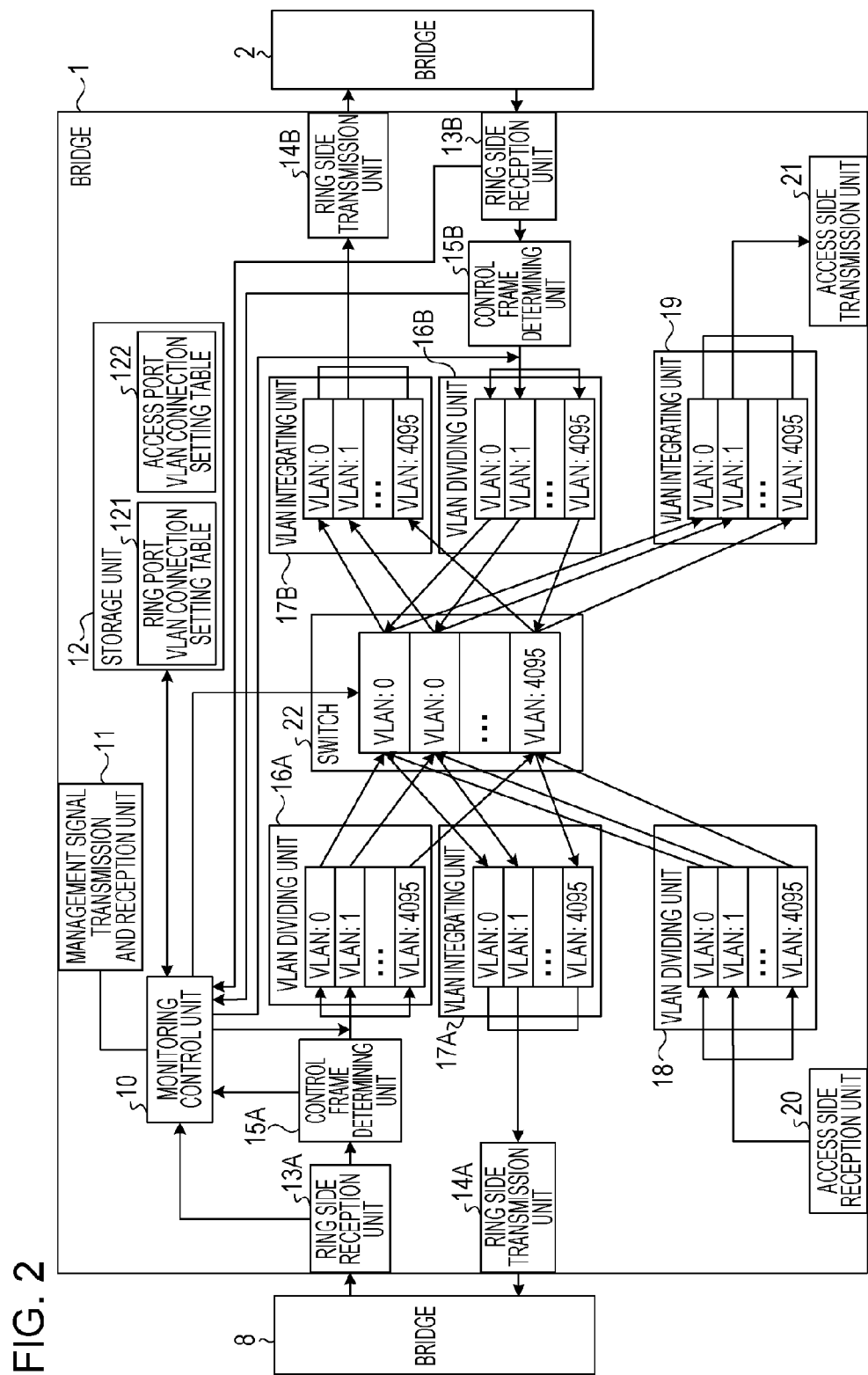
FIG. 2 is a block diagram of an information transmission device according to the embodiment.

FIG. 2 is a block diagram of an information transmission device according to the embodiment. Although the bridge 1 in FIG. 1 is described as an example in FIG. 2, the bridges 2 to 8 have the same configuration.

As illustrated in FIG. 2, the bridge 1 includes a monitoring control unit 10, a management signal transmission and reception unit 11, a storage unit 12, ring side reception units 13A and 13B, ring side transmission units 14A and 14B, and control frame determining units 15A and 15B. The bridge 1 further includes VLAN dividing units 16A and 16B, VLAN integrating units 17A and 17B, a VLAN dividing units 18, a VLAN integrating unit 19, an access side reception unit 20, and an access side transmission unit 21.

The storage unit 12 includes a ring port VLAN connection setting table 121 and an access port VLAN connection setting table 122.

The ring port VLAN connection setting table 121 is a table for storing the presence of changes and transmission and reception settings for the ring side reception units 13A and 13B and the ring side transmission units 14A and 14B for each VLAN. The transmission and reception setting is a value that indicates whether communication is being facilitated. The value "OFF" indicates that communication is not facilitated and the value "ON" indicates that communication is facilitated. The presence of changes is a value that indicates whether a change in the initial communication setting state has occurred. The value "NO" indicates that no change has occurred and the value "YES" indicates that a change has occurred.

The access port VLAN connection setting table 122 is a table for storing a priority level and transmission and reception settings for the access side reception unit 20 and the access side transmission unit 21 for each VLAN. The transmission and reception setting is a value that indicates whether communication is being facilitated. The value "OFF" indicates that communication is not facilitated and the value "ON" indicates that communication is facilitated. The priority level is a value that indicates the priority level for each VLAN. No setting of a value indicates that the VLAN has no user. A high priority level indicates a VLAN for which the priority level is high, and a low priority level indicates a VLAN for which the priority level is low.

The ring side reception units 13A and 13B have ring ports for connection to the ring network. The ring port in the ring side reception unit 13A is connected to the bridge 8. The ring port in the ring side reception unit 13B is connected to the bridge 2. Since the ring side reception units 13A and 13B perform similar operations, the following explanation uses the ring side reception unit 13A in the example.

The ring side reception unit 13A discerns whether light is being inputted into the ring port connected to the bridge 8. The ring side reception unit 13A then sends information indicating whether or not light is being inputted into the ring port connected to the bridge 8 to the monitoring control unit 10.

The ring side reception unit 13A receives the input of frames from the bridge 8 when communication between the ring port in the ring side reception unit 13A and the bridge 8 is facilitated. The ring side reception unit 13A outputs received signals to the control frame determining unit 15A.

The control frame determining units 15A and 15B determine whether a frame received from the ring side reception unit 13A and 13B is a control frame. Further, the control frame determining units 15A and 15B determine whether a received control frame is any of a first control frame to a fourth control frame. Since the control frame determining units 15A and 15B perform similar operations, the following explanation uses the control frame determining unit 15A in the example. The control frame determining unit 15A reports to the monitoring control unit 10 which of the control frames has been received when a frame received from the ring side reception unit 13A is a control frame. The control frames are described in detail below. The control frame determining unit 15A outputs frames received from the ring side reception unit 13A that are not control frames to the VLAN dividing unit 16A.

The VLAN dividing units 16A and 16B process the frames received from the control frame determining units 15A and 15B or the control frames received from the monitoring control unit 10. In this case, VLANs are provided with their respective VLAN IDs. A VLAN ID is represented by a numerical value from 0 to 4095 when the decimal system is used. "VLAN:0" to "VLAN:4095" represented inside the VLAN dividing unit 16A in FIG. 2 indicate that the VLAN dividing unit 16A is processing the frames for each VLAN ID. In the present embodiment, a VLAN having a VLAN ID of 0 is used as a control frame VLAN. The VLAN dividing unit 16A transmits the received frames to a switch 22 in accordance with hardware settings so that processing corresponding to the each VLAN ID is conducted by the switch 22. The hardware settings in this case are set by the below-mentioned monitoring control unit 10 to indicate a connection between the VLAN dividing unit 16A and the switch 22.

The switch 22 receives frames for each VLAN ID from the VLAN dividing unit 16A or the VLAN dividing unit 18 in accordance with the hardware setting. The switch 22 outputs the received frames to the VLAN integrating unit 17 or the VLAN integrating unit 19 in accordance with the hardware settings so that processing corresponding to the each VLAN ID is conducted by the VLAN integrating unit 17 or the VLAN integrating unit 19. The hardware settings in this case are set by the below-mentioned monitoring control unit 10 to indicate a connection between the VLAN integrating unit 17B and the VLAN integrating unit 19 and the switch 22.

Since the VLAN integrating units 17A and 17B perform similar operations, the following explanation uses the VLAN integrating unit 17B in the example. The VLAN integrating unit 17B receives from the switch 22 frames input from either of the VLAN dividing units 16A or 18 for each VLAN. The VLAN integrating unit 17B then outputs in order the received frames for each VLAN to the ring side transmission unit 14B.

The ring side transmission units 14A and 14B have ring ports for connecting to the ring network. The ring port in the ring side transmission unit 14A is connected to the bridge 8. The ring port in the ring side transmission unit 14B is connected to the bridge 2. Since the ring side reception units 14A and 14B perform similar operations, the following explanation uses the ring side reception unit 14B in the example.

The ring side transmission unit 14B receives frames from the VLAN integrating unit 17B. The ring side transmission unit 14B then transmits the received frames to the bridge 2 if the port connected to the bridge 2 is facilitated.

The access side reception unit 20 has an access port for connection to an external network outside of the ring network. The number of access ports is not limited in particular. In the present embodiment, the access side reception unit 20 has three access ports.

The access side reception unit 20 receives frames from an external network through the access ports when an access port in the access side reception unit 20 is facilitated. The access side reception unit 20 then outputs the received frames to the VLAN dividing unit 18.

The VLAN dividing unit 18 receives frames from an external network from the access side reception unit 20. The VLAN dividing unit 18 transmits the received frames to the switch 22 in accordance with the hardware settings so that processing corresponding to the each VLAN ID is conducted by the switch 22. The hardware settings in this case are set by the below-mentioned monitoring control unit 10 to indicate a connection between the VLAN dividing unit 18 and the switch 22.

The VLAN integrating unit 19 receives from the switch 22 frames input from either of the VLAN dividing units 16A or 16B for each VLAN. The VLAN integrating unit 19 then outputs in order the received frames for each VLAN to the access side transmission unit 21.

The access side transmission unit 21 receives the frames from the VLAN integrating unit 19. The access side transmission unit 21 then outputs the received frames to the corresponding access port when the access port assigned to the VLAN through which the received frames pass is facilitated.

The management signal transmission and reception unit 11 has a port for connecting to an operation support system (OSS) that is a system for supporting the operation of the bridges 1 to 8. The management signal transmission and reception unit 11 transmits and receives management information with the OSS through the port in the management signal transmission and reception unit 11.

Figure 3:
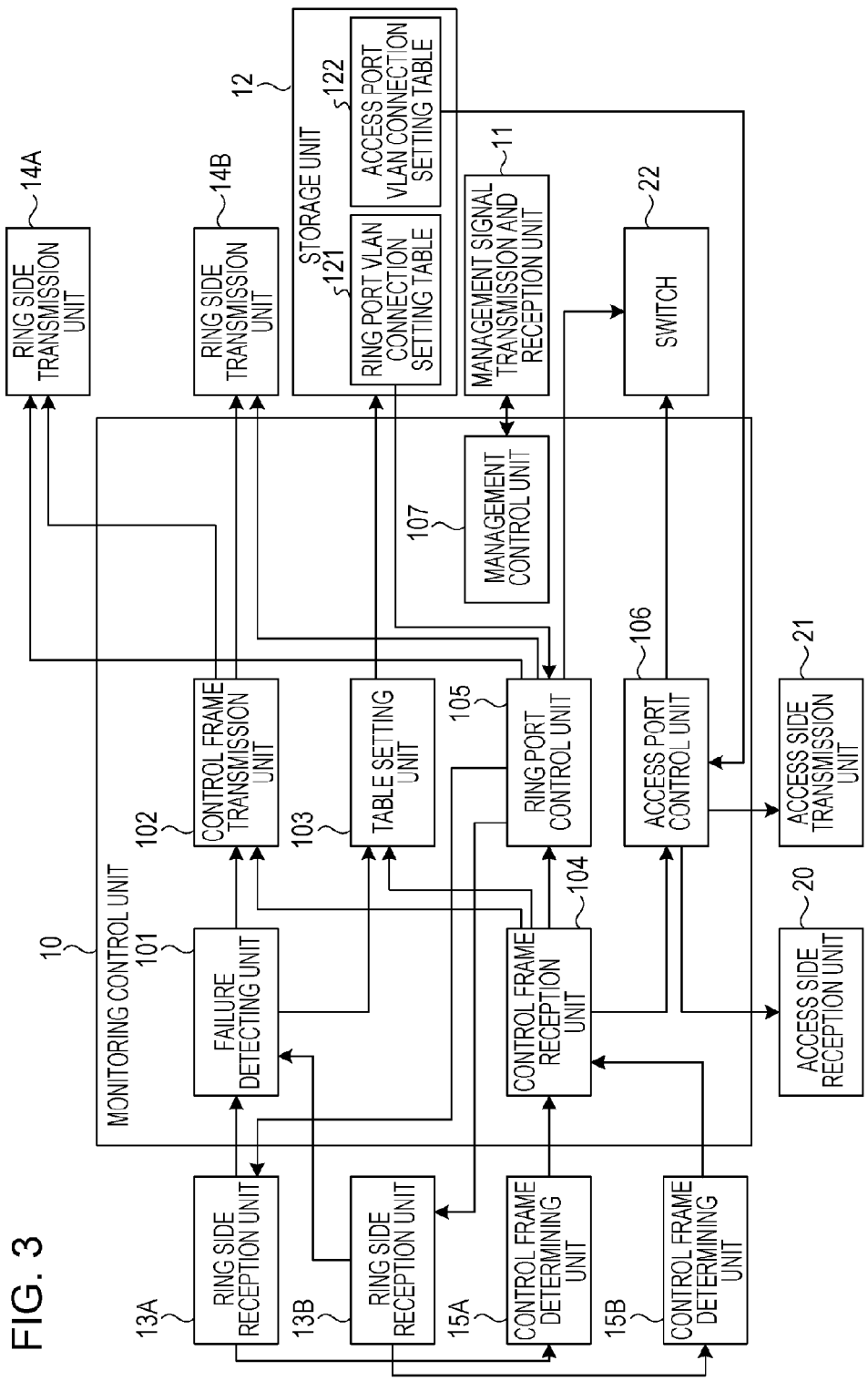
FIG. 3 is a block diagram illustrating details of a monitor control unit.

FIG. 3 is a block diagram illustrating details of a monitor control unit. The monitoring control unit 10 conducts controls for various hardware settings, control frame transmission, and for the facilitation of ring ports and access ports.

The monitoring control unit 10 includes a failure detecting unit 101, a control frame transmission unit 102, a table setting unit 103, a control frame reception unit 104, a ring port control unit 105, an access port control unit 106, and a management control unit 107.

The failure detecting unit 101 receives information regarding the presence or absence of light inputs in the ring ports from the ring side reception unit 13A or the ring side reception unit 13B. The failure detecting unit 101 determines whether each ring port is facilitated according to whether or not light is being received. An example of information received from the ring side reception unit 13A will be described below. The failure detecting unit 101 determines whether the ring port that receives frames from the bridge 8 is facilitated according to whether or not light received from the ring side reception unit 13A is being received. The failure detecting unit 101 determines that a failure in communication has occurred with the bridge 8 when information indicating that the input of light has been cut off is received from the ring side reception unit 13A. The failure detecting unit 101 determines that the failure in communication with the bridge 8 has been recovered when the information from the ring side reception unit 13A that indicates that there is no light input changes to information that indicates that light inputs are being received.

The failure detecting unit 101 reports the occurrence of the failure or the recovery of the failure to the control frame transmission unit 102. The failure detecting unit 101 reports identification information of the ring port in which the failure or the recovery has occurred to the control frame transmission unit 102. The failure detecting unit 101 reports information of the ring port in which the failure has occurred to the table setting unit 103.

The control frame transmission unit 102 receives the ring port identification information and the report indicating the failure occurrence or failure recovery from the failure detecting unit 101.

When the control frame transmission unit 102 receives the report of a failure occurrence from the failure detecting unit 101, the control frame transmission unit 102 transmits a first control frame to either the ring side transmission unit 14A or the ring side transmission unit 14B having the ring port connected to a bridge that is different from the ring port for which the failure occurred. For example, if the failure occurrence report is received from the ring side reception unit 13A, the control frame transmission unit 102 transmits the first control frame to the ring side transmission unit 14B. Herein-below, a ring port connected to a bridge that differs from the ring port in question is referred to as an "opposite ring port." For example, the ring side reception unit 13B and the ring side transmission unit 14B each have an opposite ring port that is opposite the ring port in the ring side reception unit 13A.

The first control frame is described in detail below. The first control frame is a control frame for setting a low priority user dismissal. Specifically, the first control frame is a control frame that instructs the cutoff of an access port connected to a low priority VLAN when that access port is facilitated.

The control frame is described in detail below. FIG. 4 illustrates a control frame format. The control frame has four types including the first control frame to the fourth control frame as described below. The control frame has a destination address (DA) field, a source address (SA) field, a VLAN tag field, a type field, a data field, and a frame check sequence (FCS) field. The format of the control frame is similar to an Ethernet (trademark) frame format with a normal VLAN tag. In order to differentiate between control frames and other types of frames, a value that indicates that the frame is a control frame is previously determined and the value is set in any previously determined field other than the FCS field.

For example, as illustrated in a field 150, a type value and tag control information are included in the VLAN tag field. A VLAN ID is included in the tag control information. The type value included in the VLAN tag may be used to indicate any of the first to fourth control frames. For example, type values may be previously reserved so that a type value indicating the first control frame is set as 0xfff0, a type value indicating a second control frame is set as 0xfff1, a type value indicating a third control frame is set as 0xfff2, and a type value indicating the fourth control frame is set as 0xfff3. For example, the format example illustrated in FIG. 4 includes contents that indicate the first control frame. As a result, each processing unit is able to discern whether the frame is a control frame and which type of control frame by referring to the VLAN tag.

The control frame transmission unit 102 receives a first control frame reception report from the control frame reception unit 104. At this time, the control frame transmission unit 102 receives information from the control frame reception unit 104 indicating that a control frame has been received by any of the ring ports among the ring ports in the ring side reception units 13A or 13B. If the first control frame is received, the control frame transmission unit 102 determines whether a failure has occurred in the ring port opposite the ring port that received the first control frame. If no failure has occurred in the ring port opposite the ring port that received the first control frame, the control frame transmission unit 102 outputs the first control frame to the ring side transmission unit 14A or 14B having the opposite ring port. Accordingly, if a failure has occurred in the ring port opposite the ring port that received the first control frame, the control frame transmission unit 102 outputs the second control frame to the ring side transmission unit 14A or 14B having the ring port that received the first control frame.

The second control frame is described in detail below. The second control frame is a control frame for setting communication facilitation between all sections. Specifically, the second control frame is a control frame that instructs communication facilitation in all the ring ports among the bridges 1 to 8.

The control frame transmission unit 102 receives a second control frame reception report from the control frame reception unit 104. At this time, the control frame transmission unit 102 receives information from the control frame reception unit 104 indicating that a control frame was received by any of the ring ports among the ring ports in the ring side reception units 13A or 13B. If the second control frame is received, the control frame transmission unit 102 determines whether a failure has occurred in the ring port opposite the ring port that received the second control frame. If no failure has occurred in the ring port opposite the ring port that received the second control frame, the control frame transmission unit 102 outputs the second control frame to the ring side transmission unit 14A or 14B having the opposite ring port. Accordingly, if a failure has occurred in the ring port opposite the ring port that received the second control frame, the control frame transmission unit 102 discards the second control frame.

When the control frame transmission unit 102 receives a report of a failure recovery from the failure detecting unit 101, the control frame transmission unit 102 transmits the third control frame to either the ring side transmission unit 14A or the ring side transmission unit 14B having the ring port opposite the ring port in which the failure recovery occurred.

The third control frame is described in detail below. The third control frame is a control frame for setting communication facilitation by user. Specifically, the third control frame is a control frame that instructs the bridges 1 to 8 inside the ring that communication facilitation to return to the state of the initial communication setting before the occurrence of the failure.

The control frame transmission unit 102 receives a third control frame reception report from the control frame reception unit 104. At this time, the control frame transmission unit 102 receives information from the control frame reception unit 104 indicating that a control frame was received by any of the ring ports among the ring ports in the ring side reception units 13A or 13B. If the third control frame is received, the control frame transmission unit 102 determines whether a failure recovery has occurred in the ring port opposite the ring port that received the third control frame. If the ring port opposite the ring port that received the third control frame is not a port in which the failure recovery has occurred, the control frame transmission unit 102 outputs the third control frame to the ring side transmission unit 14A or 14B having the opposite ring port. Conversely, if the ring port opposite the ring port that received the third control frame is a port in which the failure recovery has occurred, the control frame transmission unit 102 outputs the fourth control frame to the ring side transmission unit 14A or 14B having the ring port that received the third control frame.

The fourth control frame is described in detail below. The fourth control frame is a control frame for setting low priority user connections. Specifically, the fourth control frame is a control frame that instructs the facilitation of an access port connected to a low priority VLAN when that access port is disconnected.

The control frame transmission unit 102 receives a fourth control frame reception report from the control frame reception unit 104. At this time, the control frame transmission unit 102 receives information from the control frame reception unit 104 indicating that a control frame was received by any of the ring ports among the ring ports in the ring side reception units 13A or 13B. If the fourth control frame is received, the control frame transmission unit 102 determines whether a failure recovery has occurred in the ring port opposite the ring port that received the fourth control frame. If the ring port opposite the ring port that received the fourth control frame is not a port in which the failure recovery has occurred, the control frame transmission unit 102 outputs the fourth control frame to the ring side transmission unit 14A or 14B having the opposite ring port. Accordingly, if a failure recovery has occurred in the ring port opposite the ring port that received the fourth control frame, the control frame transmission unit 102 discards the fourth control frame.

The inputting of the control frames from the control frame transmission unit 102 to the ring side transmission unit 14A or 14B is described as a direct input in FIG. 3. However, the control frames are actually input into the VLAN dividing unit 16A or 16B and transmitted through the switch 22 and the VLAN integrating units 17A and 17B to the ring side transmission unit 14A or 14B as illustrated in FIG. 2.

The control frame reception unit 104 receives from the control frame determining unit 15A a control frame among the frames input into the ring side reception unit 13A and information as to which type of control frame. The control frame reception unit 104 receives from the control frame determining unit 15B a control frame among the frames input into the ring side reception unit 13B and information as to which type of control frame.

The control frame reception unit 104 then reports the reception of a control frame to the access port control unit 106 when the first control frame or the fourth control frame is received.

The control frame reception unit 104 further reports the reception of a control frame to the ring port control unit 105 when the second control frame or the third control frame is received.

The control frame reception unit 104 reports information indicating which control frame among the first to fourth control frames has been received to the table setting unit 103. Moreover, the control frame reception unit 104 outputs the received first to fourth control frames and information indicating which control frame has been received to the control frame transmission unit 102.

The table setting unit 103 receives the information of the ring port in which a failure has occurred from the failure detecting unit 101 when a failure occurs at a ring port of the host device. The table setting unit 103 sets the "transmission/reception setting" field of the corresponding ring port in the ring port VLAN connection setting table 121 to "OFF". Moreover, the table setting unit 103 sets the "change" field of the corresponding ring port in the ring port VLAN connection setting table 121 to "YES".

The table setting unit 103 receives the information indicating which control frame among the first to fourth control frames has been received from the control frame reception unit 104.

When the first control frame is received, the table setting unit 103 refers to the access port VLAN connection setting table 122 and extracts a low priority VLAN. The table setting unit 103 then changes the "transmission/reception setting" field for the extracted low priority VLAN to "OFF".

When the second control frame is received, the table setting unit 103 refers to the ring port VLAN connection setting table 121 and extracts ring ports other than the ring port in which the failure has occurred. The table setting unit 103 then changes the "transmission/reception setting" field for the extracted ring ports to "ON". Moreover, the table setting unit 103 sets the "change" field of the extracted ring ports in the ring port VLAN connection setting table 121 to "YES".

When the third control frame is received, the table setting unit 103 refers to the ring port VLAN connection setting table 121 and extracts ring ports for which the "change" field is indicated as "YES." The table setting unit 103 then changes the values in the "transmission/reception setting" field for the extracted ring ports to the opposite value. Moreover, the table setting unit 103 sets the "change" field of the extracted ring ports in the ring port VLAN connection setting table 121 to "NO".

When the fourth control frame is received, the table setting unit 103 refers to the access port VLAN connection setting table 122 and extracts a low priority VLAN. The table setting unit 103 then changes the "transmission/reception setting" field for the extracted low priority VLAN to "ON".

The access port control unit 106 changes the hardware settings of the access side reception unit 20, the access side transmission unit 21, and the switch 22 to match the previously determined initial communication settings. The previously determined initial communication settings may be received as an input from a user or may be read from a previously set file.

The access port control unit 106 receives the reception reports of the first control frame and the fourth control frame from the control frame reception unit 104.

When the first control frame is received, the access port control unit 106 refers to the access port VLAN connection setting table 122 changed by the table setting unit 103 upon receiving the first control frame. The access port control unit 106 changes the hardware settings of the access side reception unit 20, the access side transmission unit 21, and the switch 22 according to the registered contents of the access port VLAN connection setting table 122. Specifically, the access port control unit 106 changes the hardware settings of the connections between the access ports and the switch 22 so that facilitation of the low priority VLANs in the access port VLAN connection setting table 122 is cut off. As a result, the low priority VLANs are dismissed from the ring network.

When the fourth control frame is received, the access port control unit 106 refers to the access port VLAN connection setting table 122 changed by the table setting unit 103 upon receiving the fourth control frame. The access port control unit 106 changes the hardware settings of the access side reception unit 20, the access side transmission unit 21, and the switch 22 according to the registered contents of the access port VLAN connection setting table 122. Specifically, the access port control unit 106 changes the hardware settings of the connections between the access ports and the switch 22 so that facilitation of the low priority VLANs in the access port VLAN connection setting table 122 is allowed. As a result, the low priority VLANs are connected to the ring network and the settings are returned to the initial communication settings.

The ring port control unit 105 changes the hardware settings of the ring side reception units 13A and 13B, the ring side transmission units 14A and 14B, and the switch 22 to match the previously determined initial communication settings. The initial communication settings will be described below. The initial communication settings are set so that crossing points of the plurality of VLANs in the ring network do not overlap. A path through which the VLANs pass is an example of a "section" in a communication path network. The initial communication settings, which are set so that a plurality of VLANs do not pass through the same section in the ring network, represent an example "communication settings determined so that a plurality of communication paths does not go through the same section in the ring network."

The ring port control unit 105 receives the reception reports of the second control frame and the third control frame from the control frame reception unit 104.

When the second control frame is received, the ring port control unit 105 refers to the ring port VLAN connection setting table 121 changed by the table setting unit 103 upon receiving the second control frame. The ring port control unit 105 changes the hardware settings of the ring side reception units 13A and 13B, the ring side transmission units 14A and 14B, and the switch 22 according to the registered contents in the ring port VLAN connection setting table 121. Specifically, the ring port control unit 105 changes the hardware settings of the connections between the ring ports and the switch 22 so that facilitation of the ring port at which the failure occurred is cut off and the facilitation of the other ring ports is allowed. As a result, the ring port control unit 105 establishes a path for transmitting signals that avoids the failure section by connecting the ring ports other than the ring port at which the failure occurred in the ring network.

When the third control frame is received, the ring port control unit 105 refers to the ring port VLAN connection setting table 121 changed by the table setting unit 103 upon receiving the third control frame. The ring port control unit 105 changes the hardware settings of the ring side reception units 13A and 13B, the ring side transmission units 14A and 14B, and the switch 22 according to the registered contents in the ring port VLAN connection setting table 121. Specifically, the ring port control unit 105 causes the ring port for which the failure has been recovered to be facilitated and, furthermore, changes the hardware settings of the connections between the ring ports and the switch 22 so that the ring ports other than the ring port for which the failure has been recovered have the initial communication settings. As a result, the settings of the path in the ring network having the corresponding VLAN ID are returned to the initial communication settings.

The management control unit 107 receives OSS management signals from the management signal transmission and reception unit 11. The management control unit 107 controls the bridge 1 according to the received management signals. The management control unit 107 outputs reports such as an occurrence of an error in the bridge 1 to the management signal transmission and reception unit 11.

Figure 9:
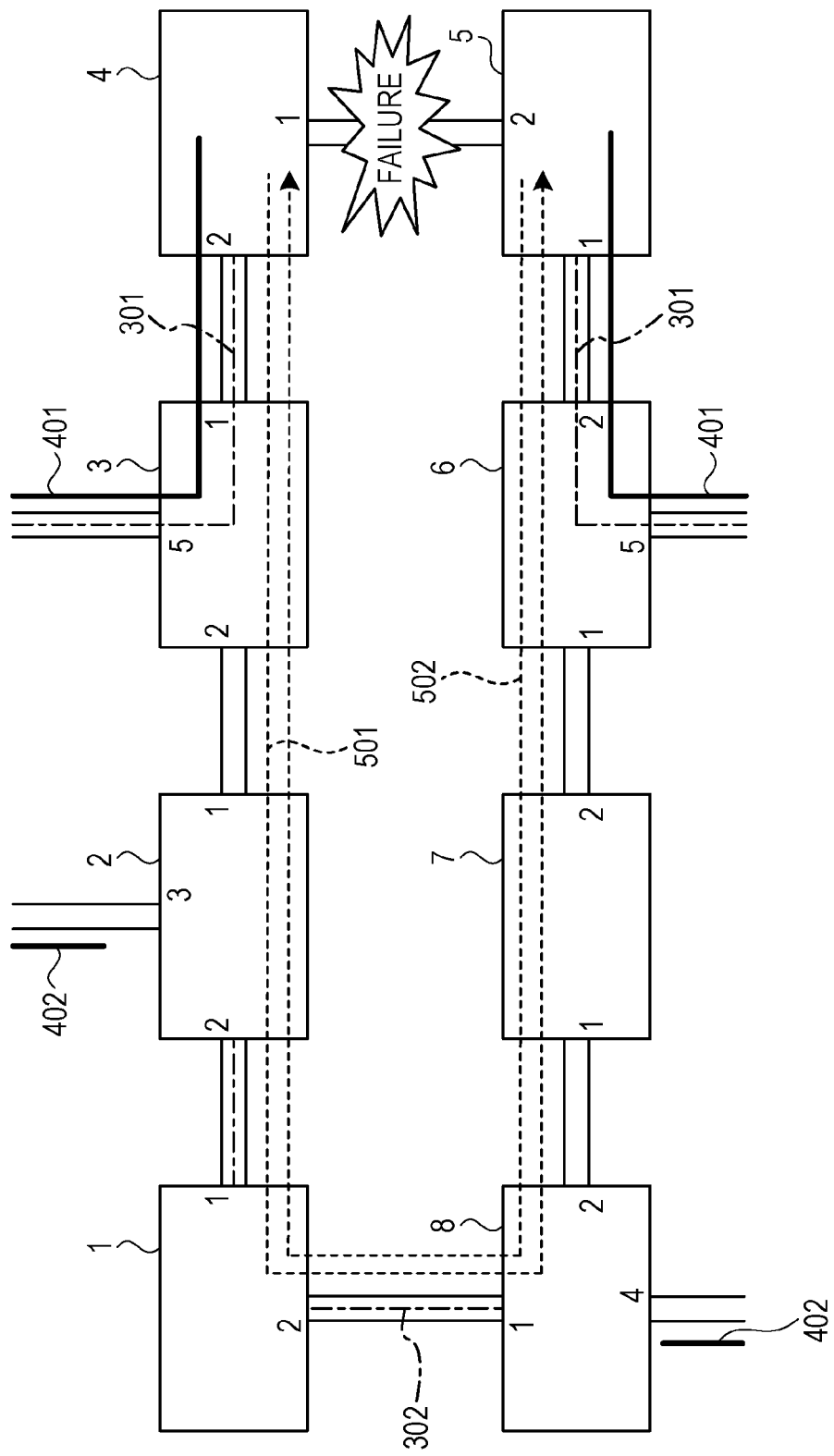
FIG. 9 illustrates a facilitation state changed by a first control frame.
Figure 11:
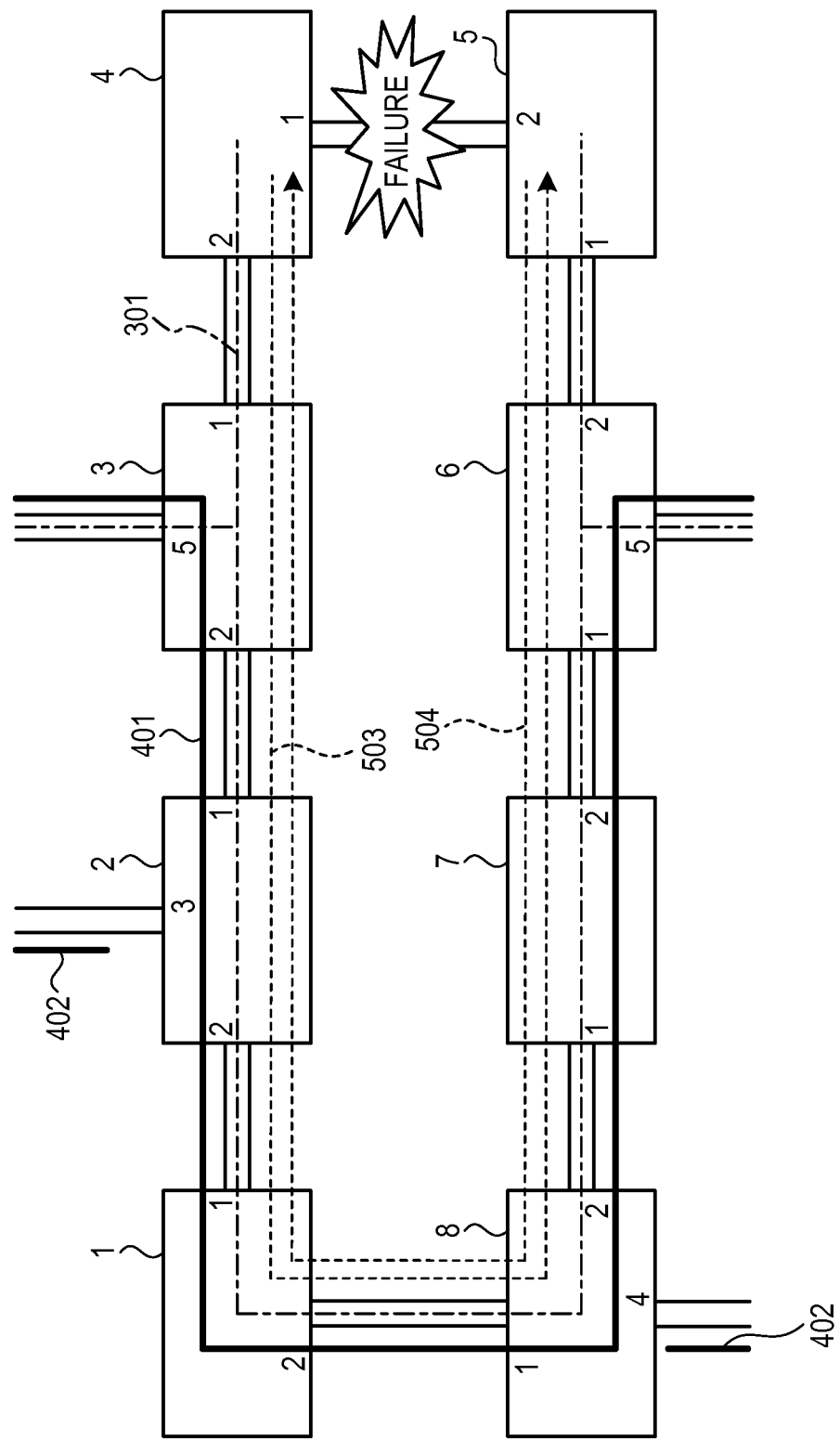
FIG. 11 illustrates a facilitation state changed by a second control frame.
Figure 15:
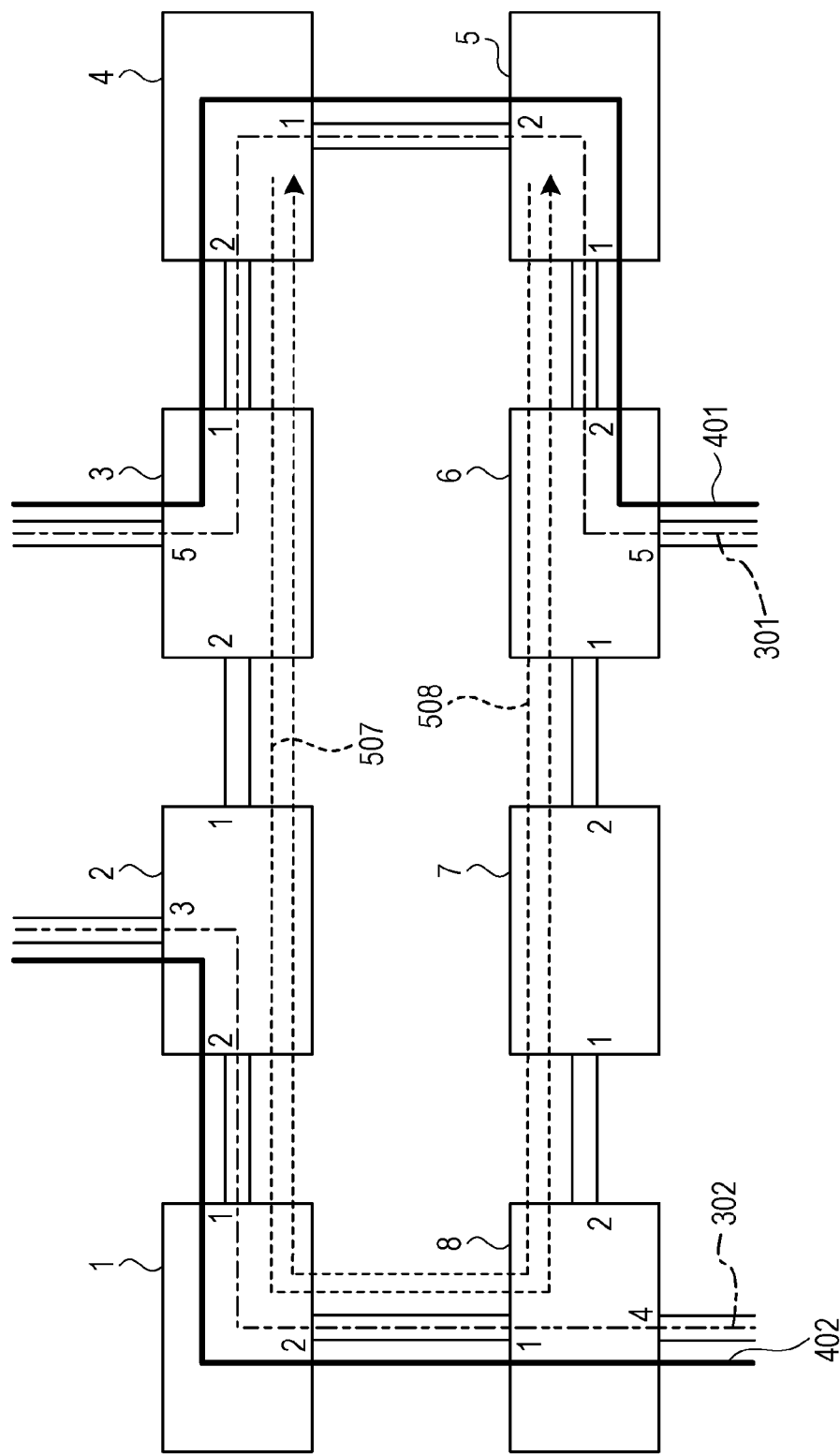
FIG. 15 illustrates a facilitation state changed by a fourth control frame.

The following describes the facilitation of communication from the failure occurrence to the recovery and the transition to the tables with reference to FIGS. 5 to 16. FIG. 5 illustrates ring port VLAN connection setting tables for bridges in which VLAN setting has not been conducted. FIG. 6 illustrates access port VLAN connection setting tables for bridges in which VLAN setting has not been conducted. FIG. 7 illustrates an initial communication setting facilitation state. FIG. 8 illustrates tables in bridges under an initial communication setting state. FIG. 9 illustrates a facilitation state changed by a first control frame. FIG. 10 illustrates tables in bridges that have received a first control frame. FIG. 11 illustrates a facilitation state changed by a second control frame. FIG. 12 illustrates tables in bridges that have received a second control frame. FIG. 13 illustrates a facilitation state changed by a third control frame. FIG. 14 illustrates tables in bridges that have received a third control frame. FIG. 15 illustrates a facilitation state changed by a fourth control frame. FIG. 16 illustrates tables in bridges that have received a fourth control frame. In the bridges 1 to 8, the ring side reception unit 13B and the ring side transmission unit 14B are assumed to be port 1 and the ring side reception unit 13A and the ring side transmission unit 14A are assumed to be port 2. A case in which the bridges 1 to 8 each have three access ports will be explained with these access ports assumed to be ports 3 to 5. The numbers written inside the bridges 1 to 8 in the drawings indicate the number of the adjacent port.

The state illustrated in FIG. 1 is a state of the ring network in which VLAN setting has not been conducted. The ring port VLAN connection setting tables 121 for the bridges 1 to 8 in this case are represented by tables 201 to 208 illustrated in FIG. 5. The tables 201 to 208 correspond respectively to the bridges 1 to 8.

As illustrated in the tables 201 to 208, settings for ports 1 and 2 that are the ring ports for each VLAN ID 0 to 4095 are described in the ring port VLAN connection setting table 121. In a state in which the VLAN is not set, the setting of the ports 1 and 2 corresponding to all the VLAN IDs are set as "OFF" in the "transmission/reception setting" field and as "NO" in the "change" field.

The access port VLAN connection setting tables 122 for the bridges 1 to 8 in FIG. 1 are represented by tables 211 to 218 illustrated in FIG. 6. The tables 211 to 218 correspond respectively to the bridges 1 to 8.

As illustrated in the tables 211 to 218, settings for the ports 3 to 5 that are the access ports for each of the VLAN IDs 0 to 4095 are described in the access port VLAN connection setting table 122. In a state in which the VLAN is not set, the setting of the ports 3 to 5 corresponding to all the VLAN IDs are set as "OFF" in the "transmission/reception setting" field and as no setting in the "priority level" field. The symbol "-" in the "priority level" fields in the tables 211 to 218 indicate that there is no setting.

Next, a state in which the initial communication settings are conducted for a VLAN having the VLAN ID of 100 is illustrated in FIG. 7. The following is a description with regard to communication in the VLAN with the VLAN ID 100. The ring port VLAN connection setting table 121 and the access port VLAN connection setting table 122 will be described by illustration only using the VLAN with the VLAN ID 100.

As illustrated in FIG. 7, hardware settings are established as indicated by connection paths 301 and 302 in the initial communication settings. Frames flow between the ports linked by lines in the connection paths 301 and 302. In the initial communication settings, the VLAN with the VLAN ID 100 has facilitation routes 401 and 402 inside the ring network. The facilitation route 401 is a VLAN used by a user 1. Additionally, the facilitation route 402 is a VLAN used by a user 2. The initial communication settings are set so that crossing points of the plurality of VLANs in the ring network do not overlap. Specifically, the paths through which the facilitation routes 401 and 402 pass are an example of "sections" in a communication path network. As illustrated in FIG. 7, the VLAN routes in the initial communication settings are determined so that the facilitation route 401 and the facilitation route 402 do not overlap. That is, the state represents an example of a state in which the facilitation route 401 and the facilitation route 402 are disposed so that a plurality of communication paths do not go through the same section inside the ring network.

In this case, the ring port VLAN connection setting tables 121 and the access port VLAN connection setting tables 122 enter the states described in the tables 201 to 208 and the tables 211 to 218 in FIG. 8.

Since frames are input in the port 1 and are output from the port 2 in the bridge 1, the "transmission/reception setting" fields for both the port 1 and the port 2 are set to "ON" in the table 201. In this case, the ports in all of the tables 201 to 208 indicate "NO" in the "change" fields since the presence of a change of the initial communication settings is used as a standard. All of the ports 3 to 5 in the table 211 are set as "OFF".

Since frames are input in the port 3 and output from the port 2 in the bridge 2, the "transmission/reception setting" field for the port 1 is set to "OFF" and set to "ON" for the port 2 in the table 202. Moreover, the "transmission/reception setting" in the table 212 is set to "ON" for the port 3 and set to "OFF" for the ports 4 and 5. Additionally, the "priority level" is set to low priority. In the drawings, the value for "priority level" is written as "Low" in the case of a low priority. As a result, since frames are not output from the port 1, the frames that pass through the facilitation route 402 do not go toward the path of the facilitation route 401.

Since frames are input in the port 5 and output from the port 1 in the bridge 3, the "transmission/reception setting" field for the port 1 is set to "ON" and set to "OFF" for the port 2 in the table 203. The "transmission/reception setting" fields in the table 213 are set to "ON" for the port 5 and "OFF" for the ports 3 and 4. Moreover, the "priority level" is set to a high priority. In the drawings, the value for the "priority level" is written as "High" in the case of a high priority. As a result, since frames are not output from the port 2, the frames that pass through the facilitation route 401 do not go toward the path of the facilitation route 402.

Since frames are input in the port 2 and output from the port 1 in the bridge 4, the "transmission/reception setting" fields for both the port 1 and port 2 are set to "ON" in the table 204. All of the ports 3 to 5 in the table 214 are set as "OFF".

Since frames are input in the port 2 and output from the port 1 in the bridge 5, the "transmission/reception setting" fields for both the port 1 and port 2 are set to "ON" in the table 205. All of the ports 3 to 5 in the table 215 are set as "OFF".

Since frames are input in the port 2 and output from the port 5 in the bridge 6, the "transmission/reception setting" field for the port 1 is set to "OFF" and set to "ON" for the port 2 in the table 206. The "transmission/reception setting" fields in the table 216 are set to "ON" for the port 5 and "OFF" for the ports 3 and 4. Moreover, the "priority level" is set to a high priority. As a result, since frames are not output from the port 1, the frames that pass through the facilitation route 401 do not go toward the path of the facilitation route 402.

Since the input and output of frames is not conducted in any of the ports in the bridge 7, the "transmission/reception setting" fields for both the port 1 and port 2 are set to "OFF" in the table 207. The "transmission/reception setting" fields of all of the ports 3 to 5 in the "transmission/reception setting" field in table 217 are set as "OFF".

Since frames are input in the port 1 and output from the port 4 in the bridge 8, the "transmission/reception setting" field for the port 1 is set to "ON" and set to "OFF" for the port 2 in the table 208. The "transmission/reception setting" fields in the table 218 are set to "ON" for the port 4 and "OFF" for the ports 3 and 5. Moreover, the "priority level" is set to low priority. As a result, since frames are not output from the port 2, the frames that pass through the facilitation route 401 do not go toward the path of the facilitation route 402.

A state is illustrated in FIG. 9 in which a communication failure occurs between the bridge 4 and the bridge 5 in the state of FIG. 7 and a first control frame is transmitted. In this case, a first control frame 501 is transmitted from the bridge 4 toward the bridge 3, and a first control frame 502 is transmitted from the bridge 5 toward the bridge 6. The facilitation of the access points in the facilitation route 402 that is a low priority VLAN is cut off by the first control frames 501 and 502. The facilitation of the access points in the facilitation route 401 that is a high priority VLAN is not cut off.

In this case, the respective tables 212 and 218 of the bridge 2 and the bridge 8 having access ports of the facilitation route 402 that is the low priority VLAN are changed as illustrated in FIG. 10. The transmission/reception setting 220 of the port 3 in the table 212 is set as "OFF." The transmission/reception setting 221 of the port 4 in the table 218 is set as "OFF." Accordingly, since the access ports of the facilitation route 401 that is a high priority VLAN are not cut off, the transmission/reception setting 222 of the port 5 in the table 213 and the transmission/reception setting 223 of the port 5 in the table 216 remain as "ON."

A state illustrated in FIG. 11 is a state after the state in FIG. 9 in which the second control frame is transmitted. In this case, a second control frame 503 is transmitted from the bridge 4 toward the bridge 3, and a second control frame 504 is transmitted from the bridge 5 toward the bridge 6. Communication is facilitated by the second control frames 503 and 504 for all the ring ports except the ring ports at which the failure occurred.

In this case, the transmission/reception setting 226 is set as "OFF" and the change 227 is set as "YES" in the table 204 for the bridge 4 that has the ring port at which the failure occurred as illustrated in FIG. 12. The transmission/reception setting 228 is set as "OFF" and the change 229 is set as "YES" in the table 205 for the bridge 5 that has the ring port at which the failure occurred. Furthermore, the transmission/reception setting 224 is set as "ON" and the change 225 is set as "YES" in the table 203 for the bridge 3. Moreover, the transmission/reception setting 230 is set as "ON" and the change 231 is set as "YES" in the table 206 for the bridge 6. Moreover, the transmission/reception setting 2320 is set as "ON," the change 233 is set as "YES," the transmission/reception setting 234 is set as "ON", and the change 235 is set as "YES" in the table 207 for the bridge 7. The transmission/reception setting 236 is set as "ON" and the change 237 is set as "YES" in the table 208 for the bridge 8.

A state is illustrated in FIG. 13 in which the communication failure between the bridge 4 and the bridge 5 in FIG. 11 is recovered and a third control frame is transmitted. In this case, a third control frame 505 is transmitted from the bridge 4 toward the bridge 3, and a third control frame 506 is transmitted from the bridge 5 toward the bridge 6. The facilitation of communication of all the ring ports is returned to the state of the initial communication settings by the third control frames 505 and 506. At this time, since the facilitation of access ports on the facilitation route 402 is still cut off, the facilitation route 402 has not yet returned to the initial communication settings. Accordingly, the facilitation route 401 is returned to the initial communication settings.

In this case, the transmission/reception setting 238 is set as "OFF" and the change 239 is set as "NO" in the table 203 for the bridge 3 as illustrated in FIG. 14. Moreover, the transmission/reception setting 240 is set as "ON" and the change 241 is set as "NO" in the table 204 for the bridge 4. The transmission/reception setting 242 is set as "ON" and the change 243 is set as "NO" in the table 205 for the bridge 5. The transmission/reception setting 244 is set as "OFF" and the change 245 is set as "NO" in the table 206 for the bridge 6. The transmission/reception setting 246 is set as "OFF," the change 247 is set as "NO," the transmission/reception setting 248 is set as "OFF", and the change 249 is set as "NO" in the table 207 for the bridge 7. The transmission/reception setting 250 is set as "OFF" and the change 251 is set as "NO" in the table 208 for the bridge 8.

A state illustrated in FIG. 15 is a state after the state in FIG. 13 in which the fourth control frame is transmitted. In this case, a fourth control frame 507 is transmitted from the bridge 4 toward the bridge 3, and a fourth control frame 508 is transmitted from the bridge 5 toward the bridge 6. The facilitation of the access points in the facilitation route 402 that is a low priority VLAN is restored by the fourth control frames 507 and 508. As a result, the communication facilitation states of the bridges 1 to 8 are returned to the state of the initial communication settings.

In this case, the respective tables 212 and 218 of the bridge 2 and the bridge 8 having access ports of the facilitation route 402 that is the low priority VLAN are changed as illustrated in FIG. 16. The transmission/reception setting 252 of the port 3 in the table 212 is set as "ON." The transmission/reception setting 253 of the port 4 in the table 218 is set as "ON." As a result, the tables are returned to the state in which the tables are in the initial communication settings state.

Figure 17:
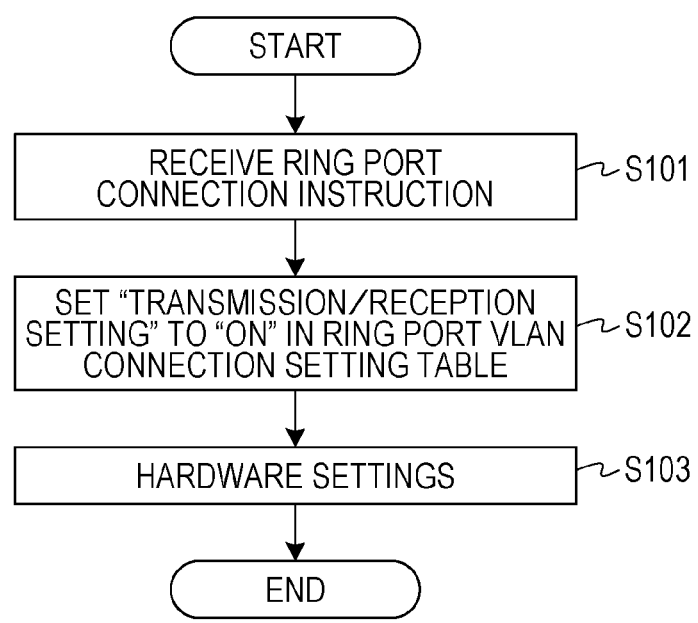
FIG. 17 is a flow chart of a block point setting process for initial communication setting.

The following describes a block point setting process for initial communication setting with reference to FIG. 17. FIG. 17 is a flow chart of a block point setting process for initial communication setting;

The table setting unit 103 receives a ring port connection instruction from a user (operation S101).

The table setting unit 103 sets the "transmission/reception setting" field of the instructed ring port in the ring port VLAN connection setting table 121 to "ON" (operation S102).

The ring port control unit 105 sets the hardware settings of the ring side reception units 13A and 13B, the ring side transmission units 14A and 14B, and the switch 22 according to the ring port VLAN connection setting table 121 (operation S103).

Figure 18:
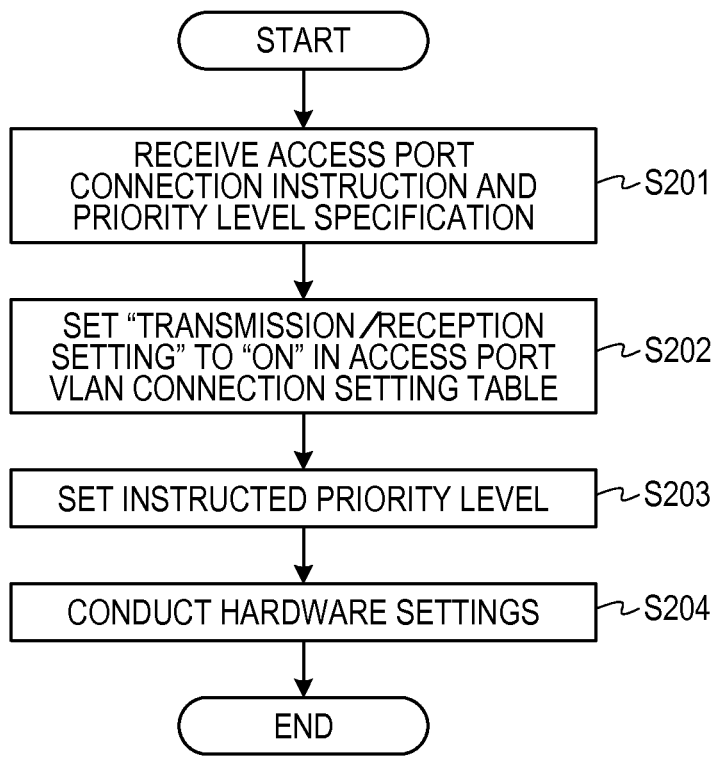
FIG. 18 is a flow chart of an access point setting process for initial communication setting.

The following describes an access port setting process for initial communication setting with reference to FIG. 18. FIG. 18 is a flow chart of an access point setting process for initial communication setting.

The table setting unit 103 receives an access port connection instruction and a priority level specification from a user (operation S201).

The table setting unit 103 then sets the transmission/reception setting of the specified access port to "ON" in the access port VLAN connection setting table 122 (operation S202). The table setting unit 103 further sets the priority level of the specified access port to "ON" in the access port VLAN connection setting table 122 (operation S203).

The access port control unit 106 conducts the hardware settings of the access side reception unit 20, the access side transmission unit 21, and the switch 22 according to the access port VLAN connection setting table 122 (operation S204).

Figure 19:
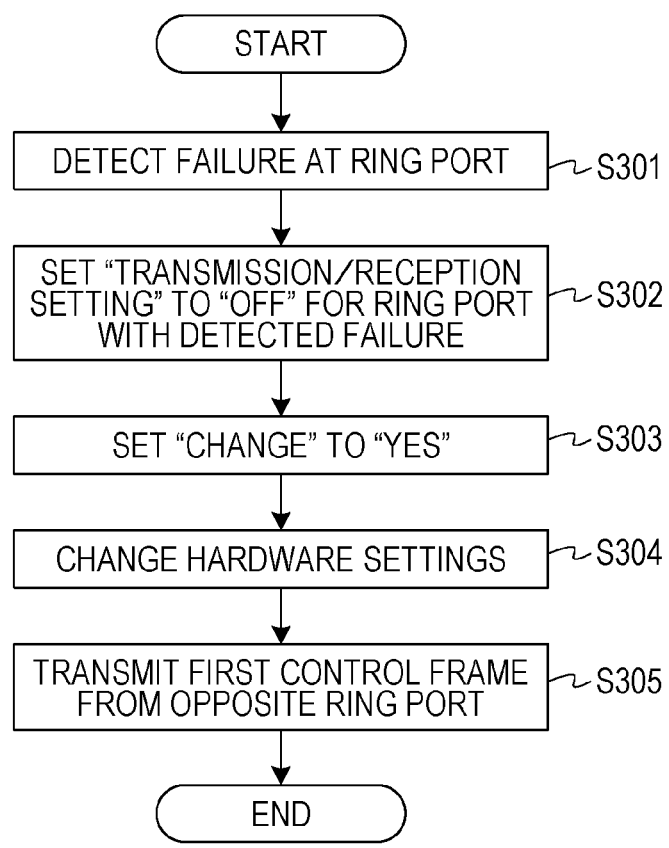
FIG. 19 is a flow chart of a process in a failure detection bridge when a failure is detected.

The following describes, with reference to FIG. 19, processing in a bridge that has detected a failure when the failure is detected. FIG. 19 is a flow chart of a process in a failure detection bridge when a failure is detected.

The failure detecting unit 101 receives information on a light input state from the ring side reception unit 13A or 13B and detects a failure at a ring port (operation S301). The failure detecting unit 101 reports the detection of the failure and information of the ring port at which the failure was detected to the control frame transmission unit 102 and the table setting unit 103.

The table setting unit 103 receives the failure detection report from the failure detecting unit 101 and sets the "transmission/reception setting" field of the ring port with the detected failure in the ring port VLAN connection setting table 121 to "OFF" (operation S302). Moreover, the table setting unit 103 sets the "change" field of the ring port with the detected failure in the ring port VLAN connection setting table 121 to "YES" (operation S303).

The ring port control unit 105 changes the hardware settings of the ring side reception units 13A and 13B, the ring side transmission units 14A and 14B, and the switch 22 according to the ring port VLAN connection setting table 121 (operation S304).

The control frame transmission unit 102 receives the failure detection report from the failure detecting unit 101 and transmits the first control frame from the ring port opposite the ring port at which the failure was detected (operation S305).

Figure 20:
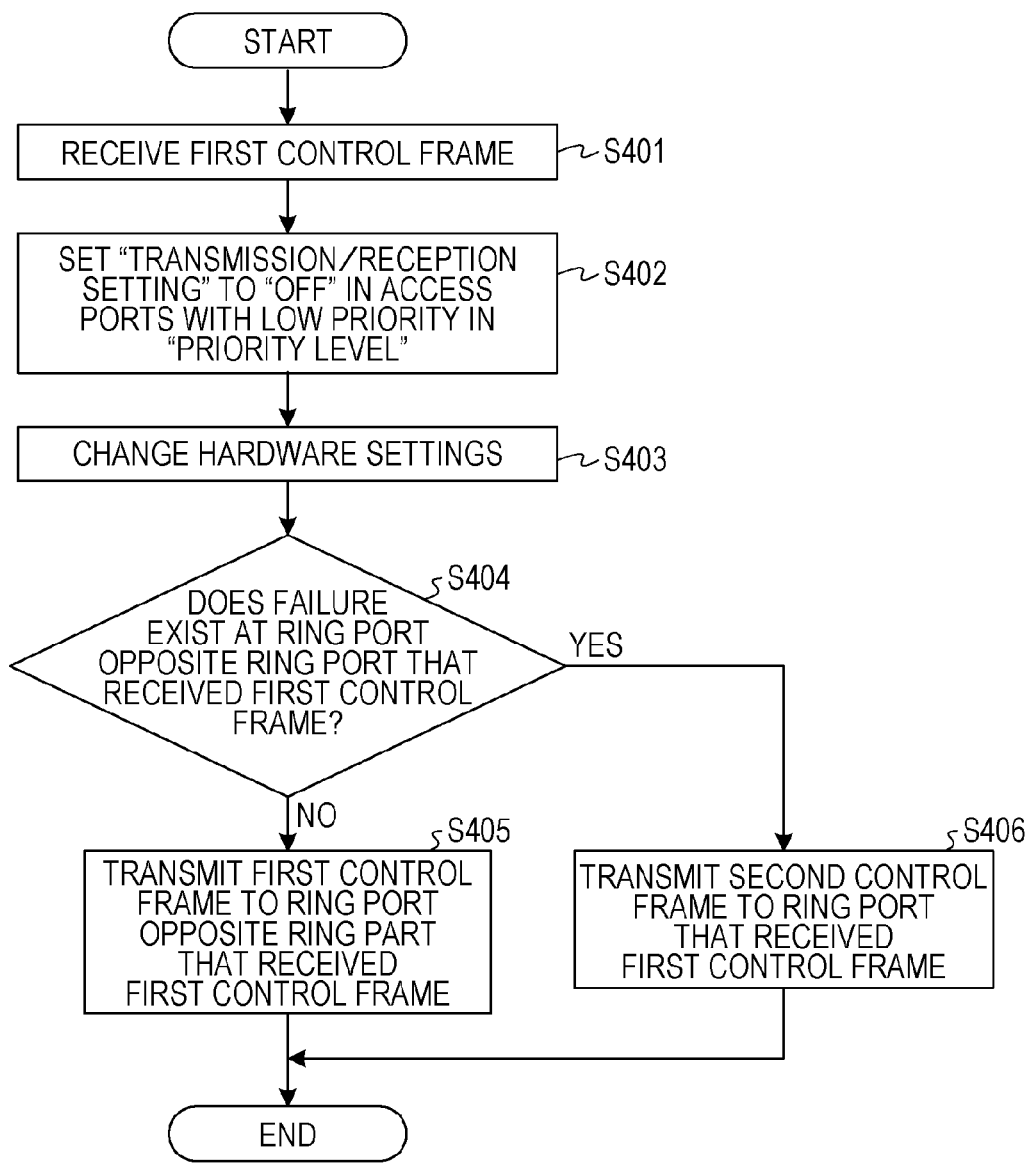
FIG. 20 is a flow chart of a process in a bridge that receives a first control frame.

The following describes, with reference to FIG. 20, processing in a bridge that has received the first control frame. FIG. 20 is a flow chart of a process in a bridge that receives a first control frame.

The control frame reception unit 104 receives the first control frame from the control frame determining unit 15A or 15B (operation S401). The control frame reception unit 104 then reports the first control frame and the information of the ring port that received the first control frame to the control frame transmission unit 102, the table setting unit 103, and the access port control unit 106.

The table setting unit 103 receives the report of the first control frame reception from the control frame reception unit 104 and sets the "transmission/reception setting" of the access ports having a low priority in the "priority level" in the access port VLAN connection setting table 122 to "OFF" (operation S402).

The access port control unit 106 receives the first control frame reception report from the control frame reception unit 104 and changes the hardware settings of the access side reception unit 20, the access side transmission unit 21, and the switch 22 according to the access port VLAN connection setting table 122 (operation S403).

The control frame transmission unit 102 receives the first control frame reception report from the control frame reception unit 104 and determines whether a failure exists at the ring port opposite the ring port that received the first control frame (operation S404).

If there is no failure at the opposite ring port (operation S404: NO), the control frame transmission unit 102 transmits the first control frame to the ring port opposite the ring port that received the first control frame (operation S405).

Conversely, if a failure exists at the opposite ring port (operation S404: YES), the control frame transmission unit 102 transmits the second control frame to the ring port that received the first control frame (operation S406).

Figure 21:
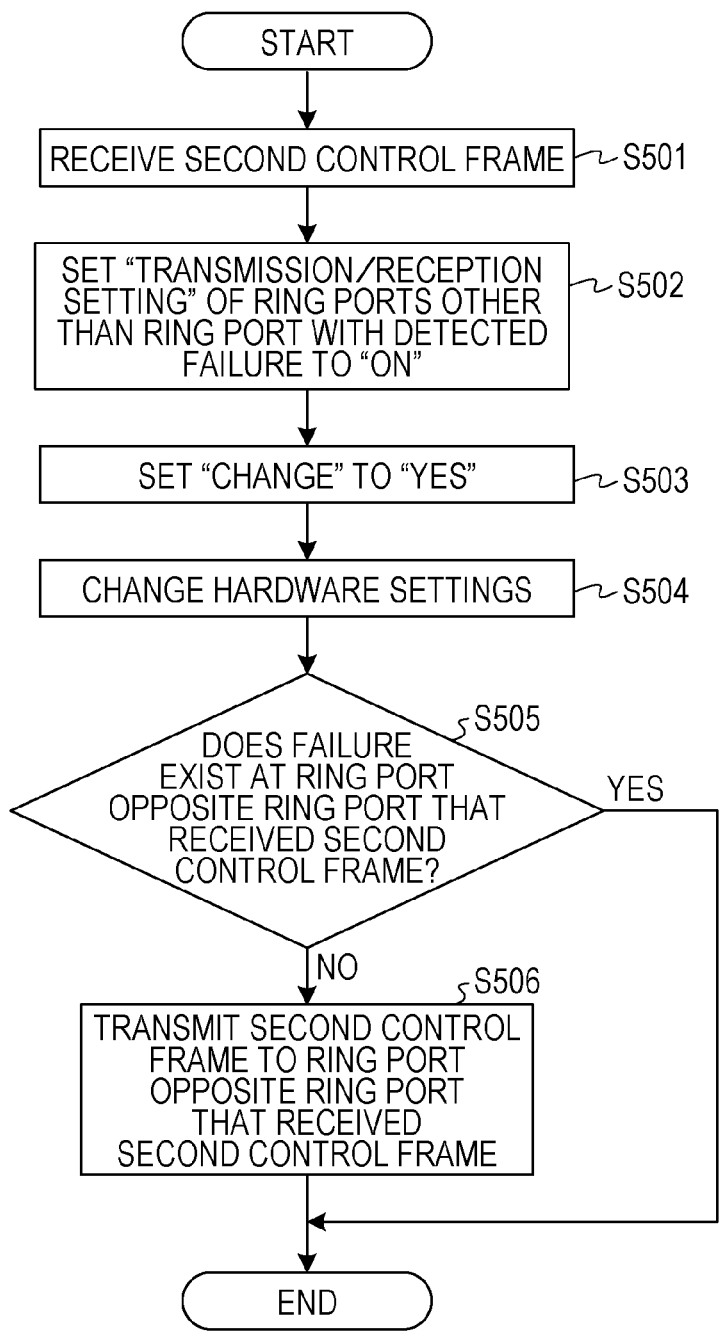
FIG. 21 is a flow chart of a process in a bridge that receives a second control frame.

The following describes, with reference to FIG. 21, processing in a bridge that has received the second control frame. FIG. 21 is a flow chart of a process in a bridge that receives a second control frame.

The control frame reception unit 104 receives the second control frame from the control frame determining unit 15A or 15B (operation S501). The control frame reception unit 104 then reports the second control frame and the information of the ring port that received the second control frame to the control frame transmission unit 102, the table setting unit 103, and the access port control unit 106.

The table setting unit 103 receives the second control frame reception report from the control frame reception unit 104 and sets the "transmission/reception setting" field of the ring ports other than the ring port with the detected failure to "ON" in the ring port VLAN connection setting table 121 (operation S502). Moreover, the table setting unit 103 sets the "change" field of the ring ports other than the ring port with the detected failure to "YES" in the ring port VLAN connection setting table 121 (operation S503).

The ring port control unit 105 receives the second control frame reception report from the control frame reception unit 104 and changes the hardware settings of the ring side reception units 13A and 13B, the ring side transmission units 14A and 14B, and the switch 22 according to the ring port VLAN connection setting table 121 (operation S504).

The control frame transmission unit 102 receives the second control frame reception report from the control frame reception unit 104 and determines whether a failure exists at the ring port opposite the ring port that received the second control frame (operation S505).

If there is no failure at the opposite ring port (operation S505: NO), the control frame transmission unit 102 transmits the second control frame to the ring port opposite the ring port that received the second control frame (operation S506).

Conversely, if a failure exists in the opposite ring port (operation S505: YES), the control frame transmission unit 102 finishes the processing.

Figure 22:
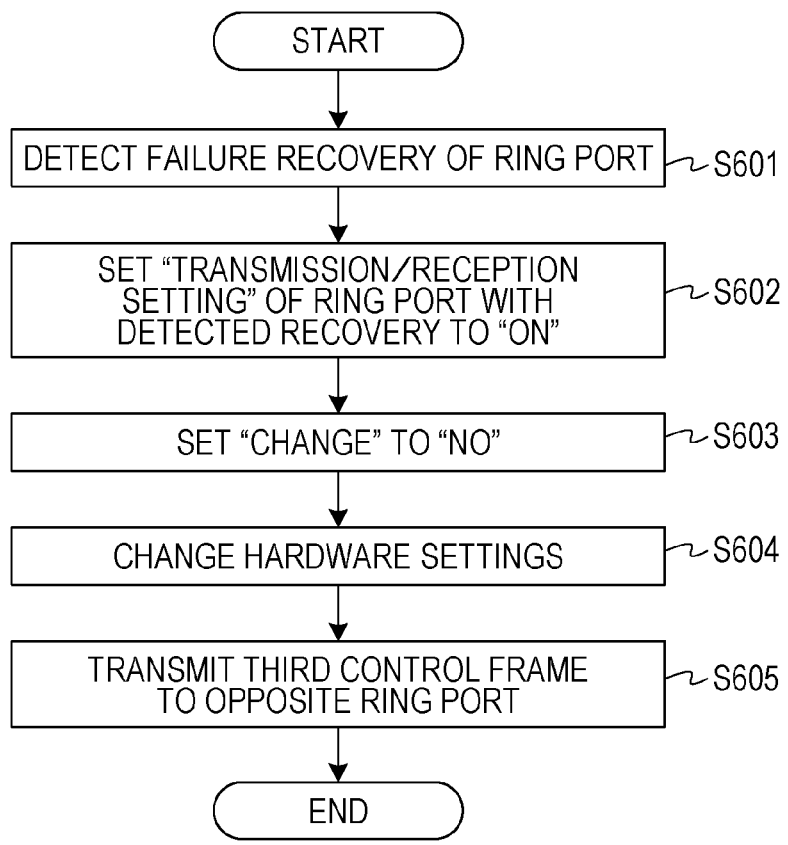
FIG. 22 is a flow chart of a process in a failure detection bridge when a failure recovery occurs.

The following describes, with reference to FIG. 22, processing in a bridge that has detected a failure when a failure recovery occurs. FIG. 22 is a flow chart of a process in a failure detection bridge when a failure recovery occurs.

The failure detecting unit 101 receives information on a light input state from the ring side reception unit 13A or 13B and detects a failure recovery of a ring port (operation S601). The failure detecting unit 101 reports the failure recovery and information of the ring port at which the failure recovery was detected to the control frame transmission unit 102 and the table setting unit 103.

The table setting unit 103 receives the failure recovery report from the failure detecting unit 101 and sets the "transmission/reception setting" field of the ring port with the detected failure recovery to "ON" in the ring port VLAN connection setting table 121 (operation S602). Moreover, the table setting unit 103 sets the "change" field of the ring port with the detected failure recovery to "NO" in the ring port VLAN connection setting table 121 (operation S603).

The ring port control unit 105 changes the hardware settings of the ring side reception units 13A and 13B, the ring side transmission units 14A and 14B, and the switch 22 according to the ring port VLAN connection setting table 121 (operation S604).

The control frame transmission unit 102 receives the failure recovery report from the failure detecting unit 101 and transmits the third control frame to the ring port opposite the ring port with the detected failure recovery (operation S605).

Figure 23:
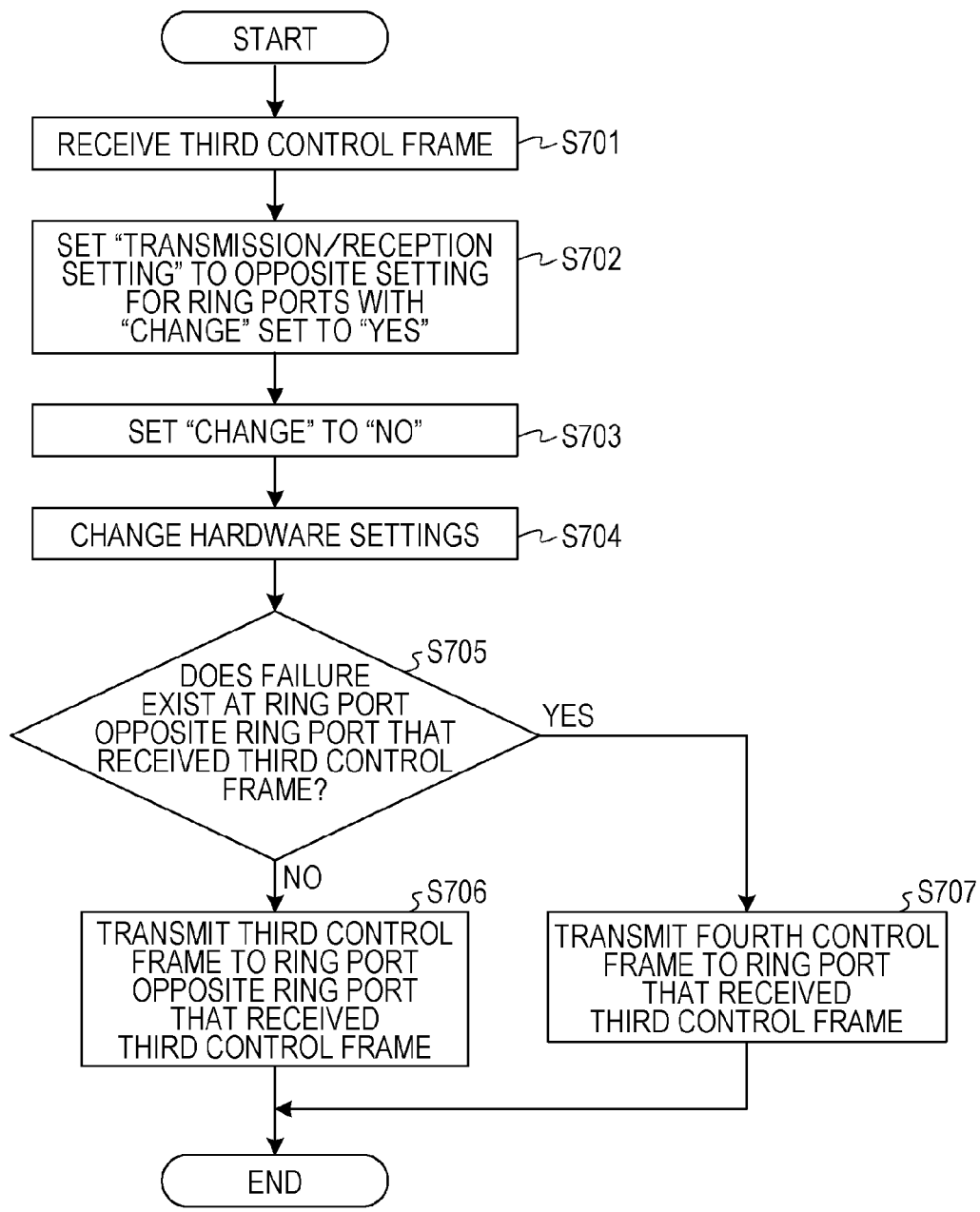
FIG. 23 is a flow chart of a process in a bridge that receives a third control frame.

The following describes, with reference to FIG. 23, processing in a bridge that has received the third control frame. FIG. 23 is a flow chart of a process in a bridge that receives a third control frame.

The control frame reception unit 104 receives the third control frame from the control frame determining unit 15A or 15B (operation S701). The control frame reception unit 104 then reports the third control frame and the information of the ring port that received the third control frame to the control frame transmission unit 102, the table setting unit 103, and the ring port control unit 105.

The table setting unit 103 receives the report of the third control frame reception from the control frame reception unit 104 and sets the "transmission/reception setting" of the access ports having "YES" in the "change" field in the access port VLAN connection setting table 122 to the opposite value (operation S702). Moreover, the table setting unit 103 sets the "change" field of the ring port with the opposite value in the "transmission/reception setting" field to "NO" in the ring port VLAN connection setting table 121 (operation S703).

The ring port control unit 105 receives the third control frame reception report from the control frame reception unit 104 and changes the hardware settings of the ring side reception units 13A and 13B, the ring side transmission units 14A and 14B, and the switch 22 according to the ring port VLAN connection setting table 121 (operation S704).

The control frame transmission unit 102 receives the third control frame reception report from the control frame reception unit 104 and determines whether a failure exists in the ring port opposite the ring port that received the third control frame (operation S705).

If there is no failure in the opposite ring port (operation S705: NO), the control frame transmission unit 102 transmits the third control frame to the ring port opposite the ring port that received the third control frame (operation S706).

Conversely, if there is a failure at the opposite ring port (operation S705: YES), the control frame transmission unit 102 transmits the fourth control frame to the ring port that received the third control frame (operation S707).

Figure 24:
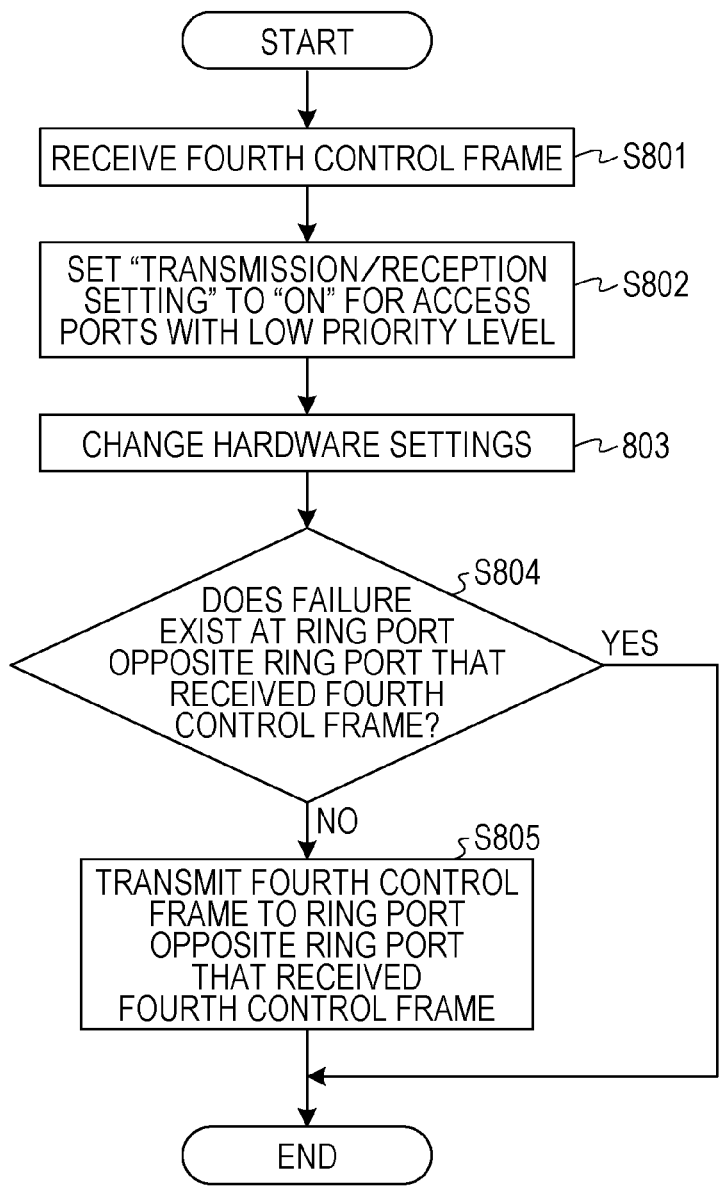
FIG. 24 is a flow chart of a process in a bridge that receives a fourth control frame.

The following describes, with reference to FIG. 24, processing in a bridge that has received the fourth control frame. FIG. 24 is a flow chart of a process in a bridge that receives a fourth control frame.

The control frame reception unit 104 receives the fourth control frame from the control frame determining unit 15A or 15B (operation S801). The control frame reception unit 104 then reports the fourth control frame and the information of the ring port that received the fourth control frame to the control frame transmission unit 102, the table setting unit 103, and the access port control unit 106.

The table setting unit 103 receives the report of the fourth control frame reception from the control frame reception unit 104 and sets the "transmission/reception setting" of the access ports having a low priority in the "priority level" in the access port VLAN connection setting table 122 to "ON" (operation S802).

The access port control unit 106 receives the fourth control frame reception report from the control frame reception unit 104 and changes the hardware settings of the access side reception unit 20, the access side transmission unit 21, and the switch 22 according to the access port VLAN connection setting table 122 (operation S803).

The control frame transmission unit 102 receives the fourth control frame reception report from the control frame reception unit 104 and determines whether a failure exists at the ring port opposite the ring port that received the fourth control frame (operation S804).

If there is no failure at the opposite ring port (operation S804: NO), the control frame transmission unit 102 transmits the fourth control frame to the ring port opposite the ring port that received the fourth control frame (operation S805).

Conversely, if there is a failure at the opposite ring port (operation S804: YES), the control frame transmission unit 102 finishes the processing.

Hardware Configuration

Figure 25:
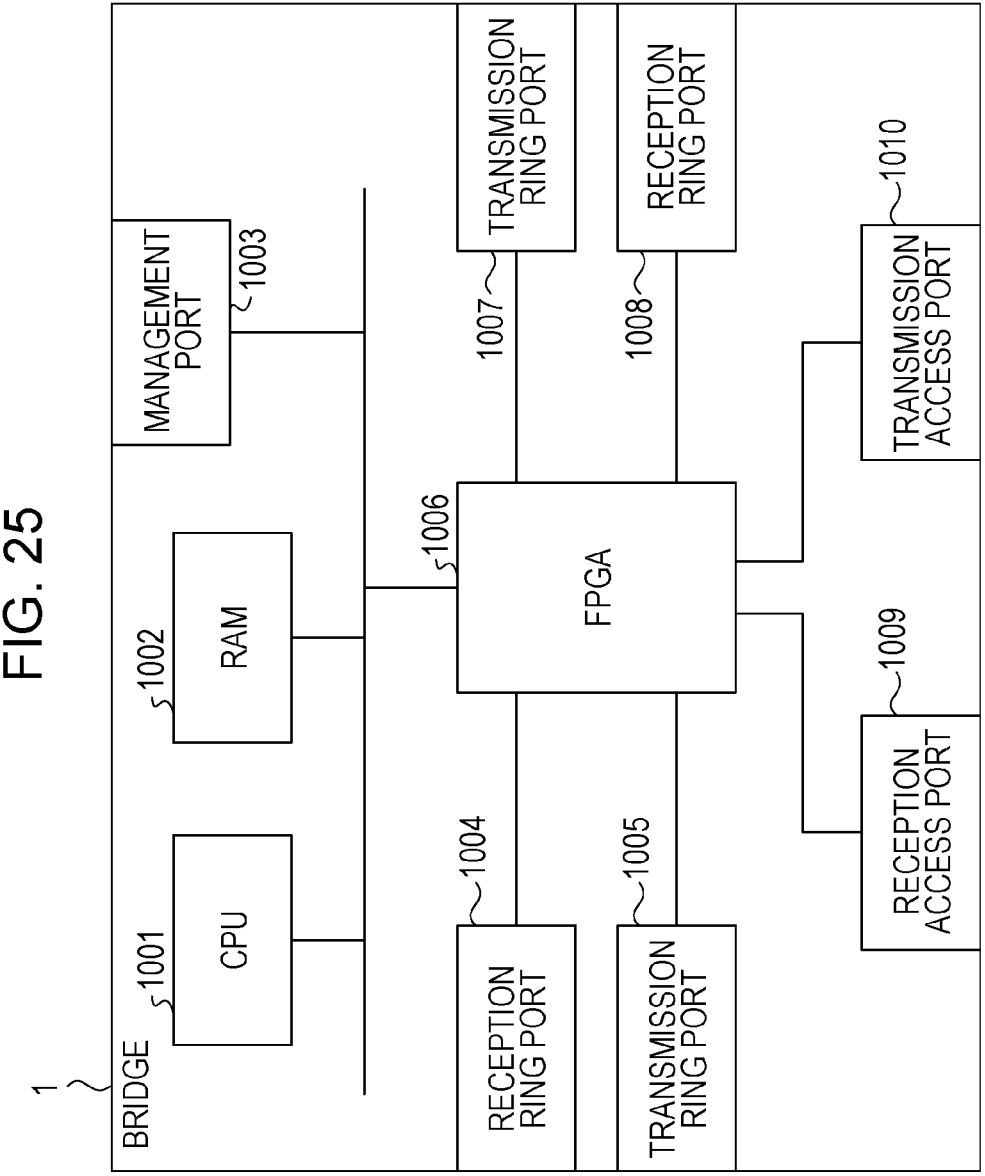
FIG. 25 is a hardware diagram of a bridge according to the embodiment.

An explanation of a bridge hardware configuration according to the present embodiment will be explained with reference to FIG. 25. FIG. 25 is a hardware diagram of a bridge according to the embodiment. The example herein uses the bridge 1.

As illustrated in FIG. 25, the bridge 1 according to the present embodiment includes a central processing unit (CPU) 1001, a random access memory (RAM) 1002, and a field programmable gate array (FPGA) 1006. The bridge 1 further includes a management port 1003, reception ring ports 1004 and 1008, transmission ring ports 1005 and 1007, a reception access port 1009, and a transmission access port 1010.

The FPGA 1006 is programmed on the basis of a design for implementing the functions, for example, of the VLAN dividing units 16A, 16B and 18, the VLAN integrating units 17A, 17B and 19, and the switch 22.

The reception ring ports 1004 and 1008 and the transmission ring ports 1005 and 1007 are ports for connections with other bridges to form a ring network. The CPU 1001 and the reception ring ports 1004 and 1008 implement, for example, the functions of the ring side reception units 13A and 13B. The CPU 1001 and the transmission ring ports 1005 and 1007 implement, for example, the functions of the ring side transmission units 14A and 14B.

The reception access port 1009 and the transmission access port 1010 are ports for connections with networks outside of the ring network. The CPU 1001 and the reception access port 1009 implement, for example, the functions of the access side reception unit 20. The CPU 1001 and the transmission access port 1010 implement, for example, the functions of the access side transmission unit 21.

The management port 1003 is a port for a connection with the OSS. The CPU 1001 and the management port 1003 implement, for example, the functions of the management signal transmission and reception unit 11.

The CPU 1001 and the RAM 1002 implement the functions of the monitoring control unit 10 and the like illustrated in FIGS. 2 and 3. Specifically, the RAM 1002 stores various programs for implementing the processing by the failure detecting unit 101, the control frame transmission unit 102, the table setting unit 103, the control frame reception unit 104, the ring port control unit 105, the access port control unit 106, and the management control unit 107 and the like. The CPU 1001 creates processes for implementing the above functions by reading and executing various programs stored in the RAM 1002.

As described above, the information transmission device according to the embodiment allows for the setting of a path in which a plurality of VLANs with the same VLAN ID do not overlap in a ring network thereby allowing the use of one ring network with a plurality of VLANs having the same VLAN ID. When a failure occurs, low priority VLANs are dismissed from the ring network so that only high priority VLANs are able to use the ring network. Then, after the failure has been recovered, the state is returned to the initial state and once again the one ring network may be used by a plurality of VLANs having the same VLAN ID. Consequently, reliability of the ring network is maintained and the ring network may be used by a number of users exceeding the maximum number of VLANs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. An information transmission device comprising:
a pair of ring ports of a first ring port and a second ring port, each configured to communicate with an adjacent another information transmission device to form a ring network therewith;
an access port configured to communicate with a network outside of the ring network;
a communication path setting unit configured to facilitate or cut off communication of the ring ports or the access port, based on a communication setting where a number of users exceeds a maximum number of identifiers within the network determined such that a plurality of communication paths having different priority levels and assigned with the same identifiers have different sections in the ring network;
a control signal transmission unit, when a communication failure occurs between the first ring port and another information transmission device, configured to transmit, from the second ring port, a first control signal for instructing a cutoff of communication of the access port in the communication path having a low priority level, and transmit a second control signal for instructing a facilitation of communication of the ring ports;
an access port control unit, upon receiving the first control signal, configured to cut off the communication of the access port in the communication path having the low priority level; and
a ring port control unit, upon receiving the second control signal, configured to facilitate communication of the ring port having non-communication failure.

2. The information transmission device according to claim 1, wherein the plurality of communication paths include a communication path having a high priority level and a communication path having the low priority level.

3. The information transmission device according to claim 1, wherein the ring port control unit cuts off the communication of a ring port by discarding a frame transmitted from the ring port.

4. The information transmission device according to claim 1, wherein:
the control signal transmission unit transmits, from one of the pair of ring ports, a third control signal for instructing a facilitation or a cutoff of communication of the ring ports, based on the communication setting, and transmits a fourth control signal for instructing a facilitation or a cutoff of communication of the access port, based on the communication setting, when the communication failure is recovered;
the ring port control unit, upon receiving the third control signal, facilitates or cuts off communication of the ring ports, based on the communication setting; and
the access port control unit, upon receiving the fourth control signal, facilitates or cuts off communication of the access port, based on the communication setting.

5. The information transmission device according to claim 4, further comprising:
a control signal reception unit configured to receive the first control signal, the second control signal, the third control signal, or the fourth control signal; and
a control signal determining unit configured to determine whether a signal received by the control signal reception unit is the first control signal, the second control signal, the third control signal, or the fourth control signal.

6. The information transmission device according to claim 1, wherein the communication setting includes setting information of a facilitation and a cutoff of communication of the ring ports and the access port so that communication paths having a same VLAN ID inside the ring network have different pathways respectively, the VLAN ID being assigned to a communication path in which a frame is input from one of the outside networks via the access port into the ring network and output via another access port to another of the outside networks.

7. The transmission communication device according to claim 1, further comprising:
a connection information changing unit configured to create ring port connection information for indicating a connection or a facilitation of communication of the ring ports and create access port connection information for indicating a connection or a facilitation of communication of the access port, based on the communication setting, and change the ring port connection information and the access port connection information, based on with instructions in the first control signal and the second control signal;
wherein the ring port control unit controls the ring ports, based on the ring port connection information, and the access port control unit controls the access port, based on the access port connection information.

8. An information transmission system comprising:
a plurality of information transmission devices configured to form a ring network, wherein the information transmission device includes:
a pair of ring ports of a first ring port and a second ring port, each configured to communicate with an adjacent another information transmission device to form a ring network therewith;
an access port configured to communicate with a network outside of the ring network;
a communication path setting unit configured to facilitate or cut off communication of the ring ports or the access port, based on a communication setting where a number of users exceeds a maximum number of identifiers within the network determined such that a plurality of communication paths having different priority levels and assigned with the same identifiers have different sections in the ring network;
a control signal transmission unit, when a communication failure occurs between the first ring port and another information transmission device, configured to transmit, from the second ring port, a first control signal for instructing a cutoff of communication of the access port in the communication path having a low priority level, and transmit a second control signal for instructing a facilitation of communication of the ring ports;
an access port control unit, upon receiving the first control signal, configured to cut off the communication of the access port in the communication path having the low priority level; and
a ring port control unit, upon receiving the second control signal, configured to facilitate communication of the ring port having non-communication failure.

9. An information transmission method for an information transmission system including a plurality of information transmission devices forming a ring network and having a pair of ring connection ports connected to ring networks respectively and an external connection port connected to a network outside of the ring network, the information transmission method comprising:
causing, in all of the information transmission devices, a facilitation or a cutoff of communication of two ring ports for communicating with an adjacent another information transmission device that forms the ring network and an access port for communicating with a network outside of the ring network, based on a communication setting where a number of users exceeds a maximum number of identifiers within the network determined such that a plurality of communication paths having different priority levels and assigned with the same identifiers pass different sections in the ring network;
when a communication failure occurs between specific information transmission devices,
causing transmission of, from one of the ring ports at which the communication failure did not occur to the specific information transmission devices, a first control signal for instructing a cutoff of communication of the access port in the communication path having a predetermined low priority level;
causing all of the information transmission devices to receive the first control signal and to cut off communication of the access port in the communication path having the low priority level;
causing the specific information transmission devices to transmit a second control signal for instructing a facilitation of communication of the ring port at which the communication failure did not occur; and
causing all the information transmission devices to receive the second control signal and to facilitate communication of the ring port at which the communication failure did not occur.

\* \* \* \* \*